(12) United States Patent
Yazami

(10) Patent No.: US 11,431,037 B2
(45) Date of Patent: Aug. 30, 2022

(54) METHOD AND SYSTEM FOR FAST-CHARGING AN ELECTROCHEMICAL CELL AND FAST-CHARGING CONTROLLER IMPLEMENTED IN THIS SYSTEM

(71) Applicant: YAZAMI IP PTE. LTD., Singapore (SG)

(72) Inventor: Rachid Yazami, Singapore (SG)

(73) Assignee: YAZAMI IP PTE. LTD., Singapore (SG)

( * ) Notice: Subject to any disclaimer, the term of this patent is extended or adjusted under 35 U.S.C. 154(b) by 0 days.

(21) Appl. No.: 16/770,550

(22) PCT Filed: Dec. 6, 2018

(86) PCT No.: PCT/IB2018/059705
§ 371 (c)(1),
(2) Date: Jun. 5, 2020

(87) PCT Pub. No.: WO2019/162748
PCT Pub. Date: Aug. 29, 2019

(65) Prior Publication Data
US 2021/0091421 A1     Mar. 25, 2021

(30) Foreign Application Priority Data

Dec. 6, 2017  (SG) .......................... 10201710301V

(51) Int. Cl.
*H01M 10/44* (2006.01)
*H02J 7/00* (2006.01)

(52) U.S. Cl.
CPC .......... *H01M 10/44* (2013.01); *H02J 7/0048* (2020.01); *H02J 7/00711* (2020.01)

(58) Field of Classification Search
CPC ..... H02J 7/0048; H02J 7/00711; H01M 10/44
(Continued)

(56) References Cited

U.S. PATENT DOCUMENTS

| 5,440,221 A | 8/1995 | Landau et al. |
| 5,905,364 A * | 5/1999 | Ookita ................. H02J 7/00711 |
| | | 320/141 |

(Continued)

OTHER PUBLICATIONS

International Search Report for International Application No. PCT/IB2018/059705 dated Mar. 4, 2019, 7 pages.
(Continued)

*Primary Examiner* — Nathaniel R Pelton
(74) *Attorney, Agent, or Firm* — TraskBritt

(57) ABSTRACT

A method for fast-charging an electrochemical cell comprises the steps of: —providing the electrochemical cell, the electrochemical cell presenting an initial state of charge (SOC), and—providing a time-varying charging voltage to the electrochemical cell, thereby generating a charging current resulting in charging of the electrochemical cell from the initial SOC up to a target value $SOC_f$ for the state of charge. The step of providing a time-varying charging voltage involves applying N bundles of current pulses in such a way that: each bundle k ($1 \leq k \leq N$) comprises a variable number $P_k$ of $i_k$ pulses ($1 \leq i_k \leq P_k$), each $i_k$ pulse in a k bundle being defined by a C-rate equal to $n_{i,k} \cdot C$ and a duration $\tau_{i,k}$. at each pulse $i_k$, the state of charge (SOC) is increased by $\delta_{ik}$ (%)=$n_{i,k} \cdot \tau_{i,k}/M$, with M as a predetermined parameter.

16 Claims, 30 Drawing Sheets

(58) Field of Classification Search
USPC .......................................................... 320/139
See application file for complete search history.

(56) References Cited

U.S. PATENT DOCUMENTS

| | | | |
|---|---|---|---|
| 6,229,285 B1 * | 5/2001 | Ding | .................. H02J 7/00047 320/132 |
| 9,065,292 B2 | 6/2015 | Yazami | |
| 9,425,646 B2 | 8/2016 | Wang | |
| 2005/0099162 A1 * | 5/2005 | Ding | .................... H02J 7/00711 320/141 |
| 2010/0264879 A1 | 10/2010 | Lim et al. | |
| 2015/0204625 A1 | 7/2015 | Pearson et al. | |
| 2016/0011898 A1 | 1/2016 | Lee et al. | |
| 2017/0229877 A1 | 8/2017 | Zhang | |
| 2017/0229891 A1 | 8/2017 | Lee et al. | |
| 2017/0256960 A1 | 9/2017 | Shin et al. | |
| 2017/0288417 A1 | 10/2017 | Trichy | |

OTHER PUBLICATIONS

International Written Opinion for International Application No. PCT/IB2018/059705 dated Mar. 4, 2019, 9 pages.

* cited by examiner

METHOD AND SYSTEM FOR FAST-CHARGING AN ELECTROCHEMICAL CELL AND FAST-CHARGING CONTROLLER IMPLEMENTED IN THIS SYSTEM

CROSS-REFERENCE TO RELATED APPLICATIONS

This application is a national phase entry under 35 U.S.C. § 371 of International Patent Application PCT/M2018/059705, filed Dec. 6, 2018, designating the United States of America and published as International Patent Publication WO 2019/162748 A1 on Aug. 29, 2019, which claims the benefit under Article 8 of the Patent Cooperation Treaty to Singapore Patent Application Serial No. 10201710301V, filed Dec. 6, 2017.

TECHNICAL FIELD

The present disclosure relates to a method for fast-charging an electrochemical cell. It also relates to a fast-charging system implementing this method and to fast-charging controller implemented in this system.

BACKGROUND

Many rechargeable (secondary) battery chemistries are currently produced such as: i. Lithium ion batteries (LIB), ii. Lead acid batteries (LAB), iii. Nickel-cadmium batteries (NiCd), iv. Nickel Metal Hydride batteries (NiMH), v. Redox flow batteries (RFB) and Sodium sulfur batteries (NaS). In 2016 above 450 GWh in batteries were produced worldwide; 350 GWh of which are LAB and 90 GWh are LIB. In 2016 LAB and LIB generated USD35B and US30B in revenue, respectively, out of a total market of USD69B. Other batteries generated about USD4B in revenue. The overall market of rechargeable batteries has a CAGR of 8%.

LIB is the fastest growing segment with average CAGR of 25% over the last 10 years. LIB dominate the autonomous power sources with close to 7 billion cells produced in 2016.

LIB main advantages are: 1) high energy density, 2) high power density, 3) long life, 4) wide range of operation temperatures, 5) No memory effect, 6) good safety record, 7) economical and, 8) recyclable.

LIB major applications include portable electronics, electrical vehicles and energy storage systems, the two latter are the fastest growing market segments.

Currently, most LIB are charged using the so called "CCCV" protocol. CCCV charging consists of applying a constant current (CC) until the voltage reached a preset value. A constant voltage (CV) is then applied to the cell until full charge is reached.

To ensure long cycle life under CCCV charging protocol requires a charging time typically comprised between 2 and 8 hours depending on type of LIB (energy or power design), application and on available power of the charging unit.

Fast charging with CCCV (below 30 minutes) is technically possible. However, CCCV fast charging results in premature end of life (EoL) of the cell and the battery system and may pose safety problems.

There is a strong demand to reduce the charging time in all LIB applications including in electro mobility, in mobile electronics and in energy storage systems (ASS).

Fast charge should not come at the expense of battery life and safety.

There is a crucial need to develop new fast-charging methods and systems different from current CCCV. Besides CCCV, other fast-charging methods have been reported:
Pulse charging (PC): consists of applying a constant current for a short time,
Combined pulse charge and pulse discharge.

Prior art fast-charging methods are, for example, disclosed in U.S. Pat. No. 9,425,646 B2 (Wang), US 2016/011898 A1 (Luo et al.), US 2015/0204625 A1 (Josephus et al.), US 2017/0256960 A1 (Shin et al.), US 2017/0229891 A1 (Lee et al.), U.S. Pat. No. 5,440,221 (Landau et al.), US 2017/0288417 A1 (Trichy), U.S. Pat. No. 9,065,292 B2 (Yazami).

U.S. Pat. No. 9,065,292 B2 discloses a method of charging an electrochemical cell, the method comprising the steps of providing the electrochemical cell and providing a time-varying charging voltage to the electrochemical cell, thereby generating a charging current resulting in charging of the electrochemical cell. The time-varying charging voltage has a non-linear time dependency provided by $V=V0\pm k(t)t$ and $Vm \leq Vs \leq Vmax$; wherein V is the time-varying charging voltage, t is time, V0 is an initial voltage, k(t) is a time dependent voltage rate, Vmin is a minimum voltage and Vmax is a maximum voltage.

It is an objective to provide a battery fast-charging method and system, in order to reduce charging time down to 10 minutes and below, and to extend battery life and enhance battery reliability and safety.

BRIEF SUMMARY

This goal is achieved with a method for fast-charging an electrochemical cell, the method comprising the steps of:
providing the electrochemical cell, the electrochemical cell presenting an initial state of charge (SOC), and
providing a time-varying charging voltage to the electrochemical cell, thereby generating a charging current resulting in charging of the electrochemical cell from the initial SOC up to a target value SOCf for the state of charge,
wherein the step of providing a time-varying charging voltage is arranged to apply N bundles of current pulses in such a way that:
each bundle k ($1 \leq k \leq N$) comprises a variable number $P_k$ of $i_k$ pulses ($1 \leq i_k \leq P_k$), each $i_k$ pulse in a k bundle being defined by a C-rate equal to $n_{i,k} \cdot C$ and a duration $\tau_{i,k}$.
at each pulse $i_k$, the state of charge (SOC) is increased by $\delta_{ik}$ (%)=$n_{i,k} \cdot \tau_{i,k}/M$, with M as a predetermined parameter.

The parameters N, M, $P_k$, $i_k$, $n_{i,k} \cdot \tau_{i,k}$, can be selected so that:
at each complete bundle k, the state of charge (SOC) is increased by an amount $\delta_K$ (%)=$\tau_{i=1}^{i=P} \delta_{Pi,k}$
$\Sigma_{k=1}^{k=N} \delta_k = SOC_f$
$\tau_{i,k}$ can be comprised between 1 s and 120 s.
The M parameter can be determined as equal to 36.
The amount of SOC increase target value can be comprised in the range [20%, 100%].
Two successive current pulse ik and ik+1 in a bundle can be separated by a rest time $\rho_{i,k}$ and two successive bundles are separated by a rest time Ok.
The parameters N, M, $P_k$, $i_k$, $n_{i,k} \cdot \tau_{i,k}$, can be selected so that the total charge time ($t_{charge}$) computed as $$t_{charge} = \Sigma_{k=1}^{k=N} \Sigma_{i=1}^{i=P_k} (\tau_{i,k} + \rho_{i,k}) + \Sigma_{k=1}^{k=N} \omega_k$$

is substantially comprised between 2 hours and 2 minutes.
The charging method according to the present disclosure can further comprise a step for determining the state of charge (SOC) of the electrochemical cell.
The SOC determination step can comprise implementing a SOC determination method among a group comprising Coulomb counting, Kalman filter, extended Kalman filter, neural networks or thermodynamics.
The SOC determination step can be at least partially implemented by an electronic circuit close to or within the electrochemical cell.

The SOC determination step can be at least partially implemented by an electronic circuit close to or within a fast-charging system implementing the charging method.

The charging method according to the present disclosure can be applied to a secondary electrochemical cell belonging, for example, to a group comprising lithium ion batteries, Sodium ion batteries, Nickel cadmium batteries, lithium polymer batteries, solid state lithium batteries, sodium-sulfur batteries, metal-air batteries, sodium-nickel chloride batteries, nickel metal hydride batteries, lead-acid batteries, or redox-flow batteries.

The metal in a metal-air battery can consist of lithium, sodium, magnesium, zinc, aluminum and a combination thereof.

According to another aspect of the present disclosure, it is proposed a system for fast-charging an electrochemical cell, comprising:
  two or more electrodes for making an electrical connection to terminals of an electrochemical cell having an initial state of charge ($SOC_i$);
  a power supply positioned in electrical communication with the two or more electrodes for providing a controllable time-varying charging voltage to the two or more electrodes; and
  a processor for controlling the charging voltage provided by the power supply, wherein the processor provides a time-varying charging voltage to the electrochemical cell, thereby generating a charging current resulting in charging of the electrochemical cell from the initial state of charge ($SOC_i$) to a state-of-charge target value ($SOC_f$),
  wherein the power supply is controlled to apply N bundles of current pulses in such a way that:
    each bundle k ($1 \leq k \leq N$) comprises a variable number $P_k$ of $i_k$ pulses ($1 \leq i_k \leq P_k$), each $i_k$ pulse in a k bundle being defined by a C-rate equal to $n_{i,k} \cdot C$ and a duration $\tau_{i,k}$,
    at each pulse $i_k$, the state of charge (SOC) is increased by $\delta_{ik}$ (%)=$n_{i,k} \cdot \tau_{i,k}/M$ with M as a predetermined parameter.

The charging system of the present disclosure can further comprise means for real-time determining the state of the charge (SOC) of the electrochemical cell.

The SOC-determination means can comprise an electronic circuit close to or within the electrochemical cell, and an electronic circuit close to or within the power supply.

According to another aspect of the present disclosure, it is proposed a secondary battery charging controller comprising a control circuit for controlling a charging voltage provided by a power supply for charging a secondary battery, wherein the control circuit controls the charging voltage to provide a time-varying charging voltage to the electrochemical cell, thereby generating a charging current resulting in charging of the electrochemical cell from the initial state of charge ($SOC_i$) to a state-of-charge target value ($SOC_f$),
  wherein the charging controller is programed to apply N bundles of current pulses in such a way that:
    each bundle k ($1 \leq k \leq N$) comprises a variable number $P_k$ of $i_k$ pulses ($1 \leq i_k \leq P_k$), each $i_k$ pulse in a k bundle being defined by a C-rate equal to $n_{i,k} \cdot C$ and a duration $\tau_{i,k}$,
    at each pulse $i_k$, the state of charge (SOC) is increased by $\delta_{ik}$ (%)=$n_{i,k} \cdot \tau_{i,k}/M$ with M as a predetermined parameter.

A new charging protocol has thus been demonstrated based on intermittent current pulses (Cascade Pulse Charging Protocol: CPC). CPC enables fast charging in 10 minutes or less.

CPC applies to any rechargeable battery chemistry including LIB, NIMH, NiCd, LAB, Redox flow, NaS, or NaNiCl2. CPC is safer than CCCV and extends battery life.

Activation polarization $\eta_a$ has been measured during pulse and plotted vs. state of charge (SOC). It is found that $\eta_a$ is low under CPC charging even at very high rate (12 C).

CPC parameters (N, $P_k$, $n_{i,k}$, $r_{i,k}$, $p_{i,k}$, Wi,k, $V_{charge}$) are adjustable to minimize the charge time and extend the battery life.

Comparing two bundles (6 C, 9 C, 12 C) and (12 C, 9 C, 6 C), the later gives lower end of charge voltage Vcharge=4.65 V vs. 4.95 V for the former. Therefore, a bundle with decreasing C-rate sequence should be preferred to a one with increasing sequence.

When the C-rate in a bundle is low such as in (1 C, 3 C, 6 C) bundle, a longer time is needed to fully charge a cell (45 minutes vs. 15 minutes).

The activation polarization $\eta_a$ under CPC is low (<200 mV), therefore, there is less damage to the cell after each charge allowing for longer cycle life.

The activation polarization $\eta_a$ profile can be used for efficient charging under varying charging current Icharge with SOC.

A relationship between $\eta_a$ and $I_{charge}$ can be drawn where $\eta_a$ and $I_{charge}$ vary in reciprocal ways as function of SOC such as:

$$I_{charge}(SOC)=k(\eta_a(SOC))-a, a>0, k=constant>0$$

The charging method according to the present disclosure can be applied to any rechargeable battery chemistry, including but not limited to NiMH, NiCd, LAB, NaS, NaNiCl2, redox flow (ZnBr, VRB, . . . ).

Charge from any initial SOC to any final SOC (not limited to 0-100% charging). For example, the fast-charging protocol CPC according to the present disclosure can be applied to charging between 20% and 80% SOC. Initial SOC can be determined by existing methods such as those based on coulomb counting, Kalman filter, Extended Kalman Filter, Neural networks or thermodynamics.

BRIEF DESCRIPTION OF THE DRAWINGS

These and other features and advantages of the present disclosure will become better understood with regards to the following description, appended claims, and accompanying drawings wherein:

DETAILED DESCRIPTION

Figure 1:
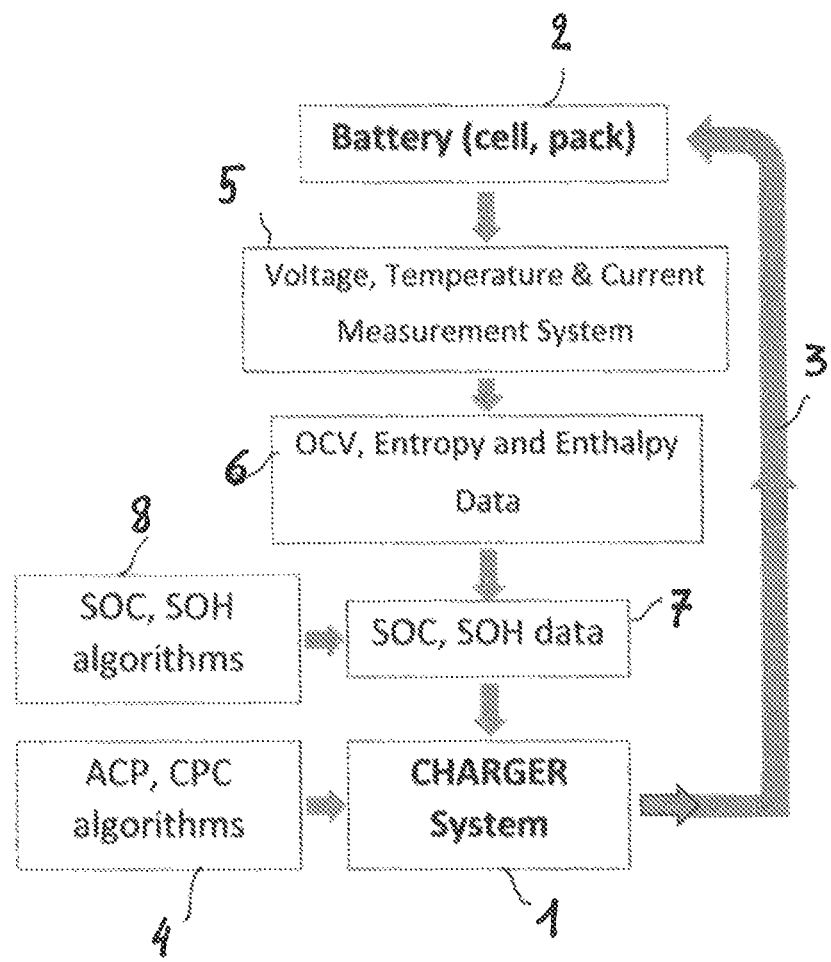
FIG. 1 is a functional scheme of a fast-charging system implementing the Cascade Pulse Charging (CPC) protocol according to the present disclosure.

With reference to FIG. 1, a charger system 1 is provided for charging for charging a battery (cell, pack) 2 via an electric connection 3. The charger system 1 implements an Adaptive Control Protocol (ACP) algorithm or a Cascade Pulse Charging (CPC) algorithm 4. The battery 2 is monitored by a measurement system 5 for measuring Voltage, Temperature and Current. From these measurement, Data 6 on Entropy, Enthalpy and Open-Circuit Voltage (OCV) are calculated and then processed by means of SOC, SOH Algorithms 8 to deliver Data 7 on State of Charge (SOC) and State of Health (SOH) of the battery 2. SOC and SOH Data 7 are processed by the charger system 1.

In this description, the battery 2 includes cylindrical LIB cells of about 700 mAh nominal capacity. Cells have been subjected to the following tests:

1. Cells are first cycled 3 times.
 a) CCCV charging (CC=C/2 rate, 350 mA; CV=4.2 V)
 b) Discharge C/2 rate to 2 V
 c) Last step is a discharge to 2.5 V
2. Cells at step c) are charged using the CPC protocol.
3. Cells are discharged under C/2 rate (350 mA) to 2.5V. Discharge capacity is then determined.

During the CPC protocol; the activation polarization $\eta_a(I,k)$ (mV) and activation resistance $R_a(i,k)$ are determined for each pulse I,k using the equations:

$$\eta_a(i,k) = e(\tau_{i,k} - t_0) - e(t_0)$$

$$R_a(i,k) = \frac{\eta_a(i,k)}{I(i,k)}$$

Where e(t) is the cell voltage during pulse, $t_0$ is a delay time and I (i,k) is the current in A. $R_a(i,k)$ is in mΩ. Here $0.5 \text{ s} < t_0 < 2 \text{ s}$.

| | | Range | |
|---|---|---|---|
| Parameter | Symbol/unit | low | high |
| Total number of bundles | k | 1 | 50 |
| Number of pulses in a bundle | $P_k$: ($1 \leq i \leq P_k$) | 1 | 10 |
| C-rate of a pulse (i, k) | $n_{i,k}$ | 0.1 | 20 |
| Time duration of pulse (i, k) | $\tau_{i,k}$ (seconds) | 1 | 30 |
| Rest time duration between two pulses | $\rho_{i,k}$ (seconds) | 2 | 60 |
| Rest time duration between two bundles | $\omega_{i,k}$ (seconds) | 2 | 60 |
| Increase in SOC at pulse (i, k) | $\delta_{i,k}$ (%) | 1 | 25 |
| Increase in SOC at bundle k | $\delta_k$ (%) | 3 | 50 |
| Total charge time duration | | 5 | 300 |
| Activation polarization | | −50 | 200 |
| Charge voltage limit | | 3.6 | 5 |

Note:
*C-rate is defined as the ratio of the charge current of a pulse $1_{ik}$ (in A) to the nominal capacity of the cell (Q in Ah):

$$n_{i,k} = \frac{1_{i,k}}{Q} (hr^{-1})$$

Examples: $n_{ik} = 2$ and $n_{i,k} = 0.33$ correspond to a charge in 0.5 hour and in 3 hours, respectively. The C-rate definition applies likely to charge and to discharge rates.

Figure 2:
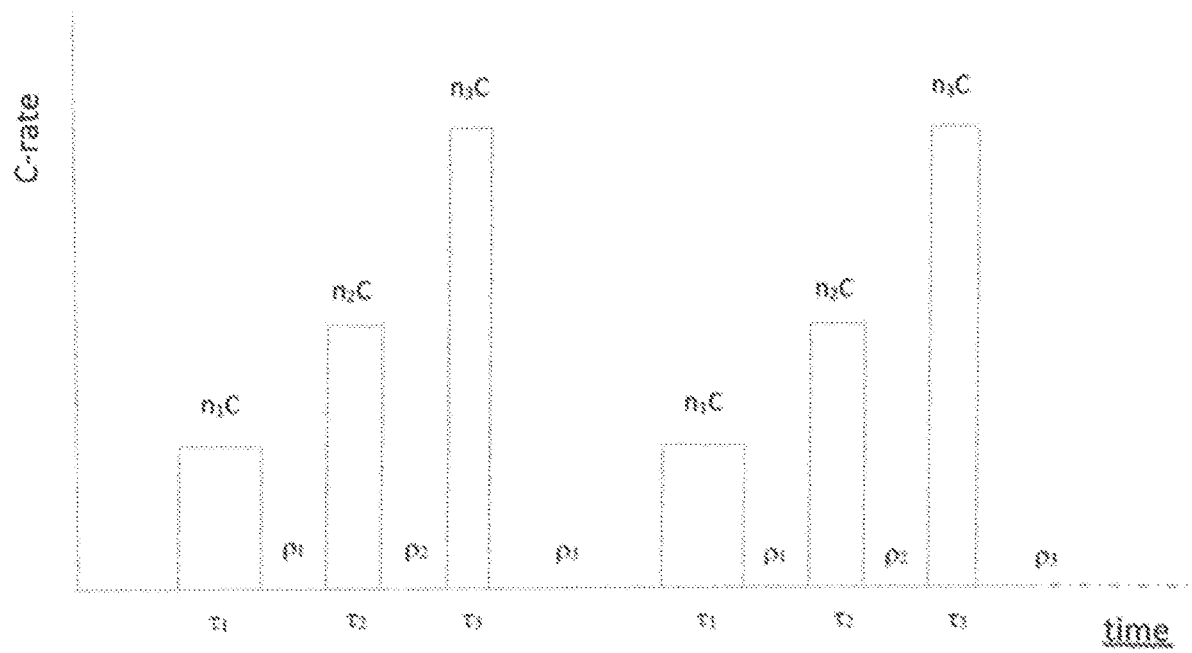
FIG. 2 is an illustration of a charging current profile during bundles, within the charging process according to the present disclosure.

FIG. 2 illustrates a charging current profile during bundles, measured during the implementation of the CPC charging method according to the present disclosure, where $n_i C$ is the C-rate of the $i^{th}$ pulse (A), $\tau_i$ is duration of the $i^{th}$ pulse (s) and $\rho_i$ is the duration of the $i^{th}$ rest time (s).

Figure 3:
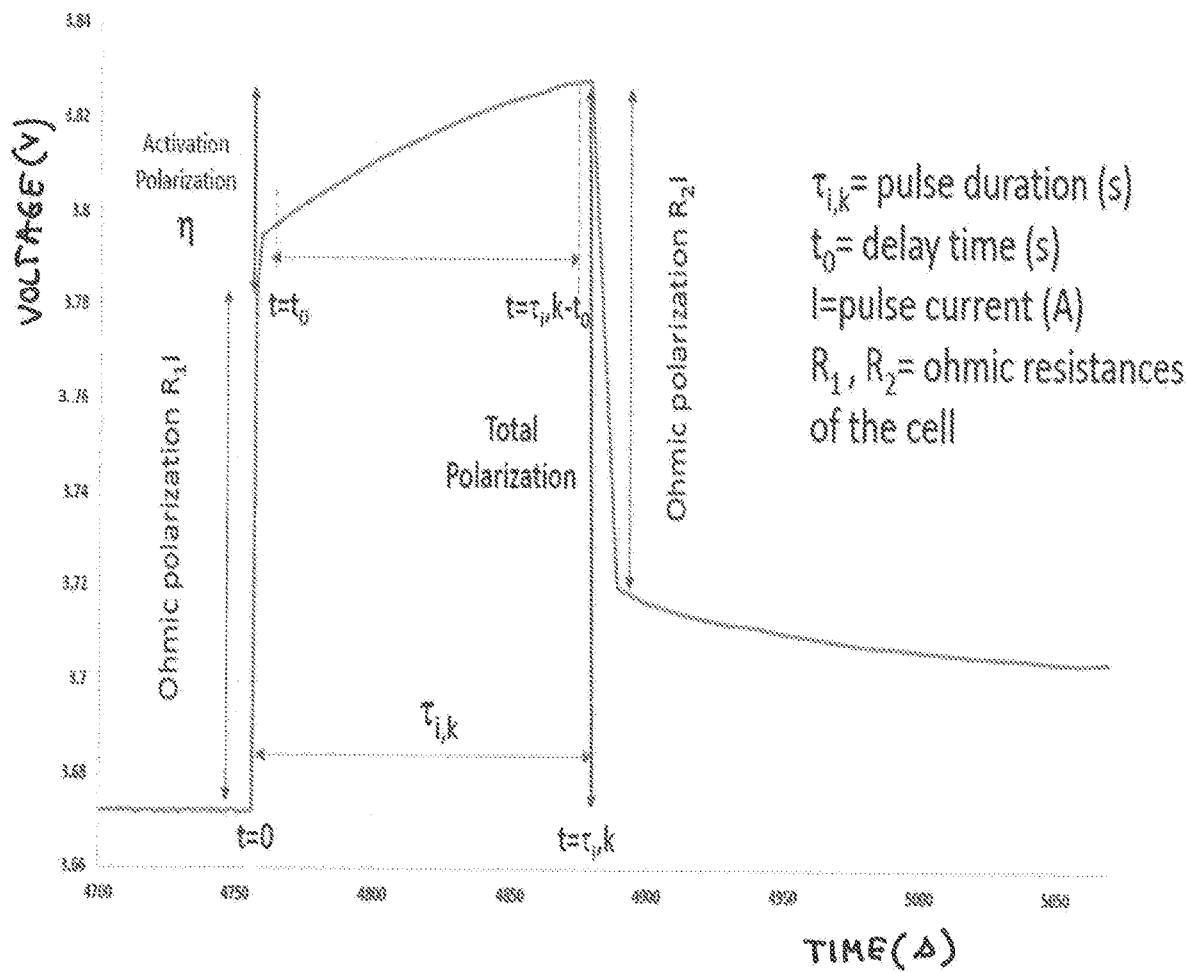
FIG. 3 illustrates a typical voltage profile during a current pulse, observed in the charging process according to the present disclosure.

A corresponding typical voltage profile during a current pulse is represented in FIG. 3, where $\tau_{i,k}$ is the pulse duration (s), to is a delay time (s), I is the pulse current (A) and $R_1$, $R_2$ are ohmic resistances of the cell.

Figure 4:
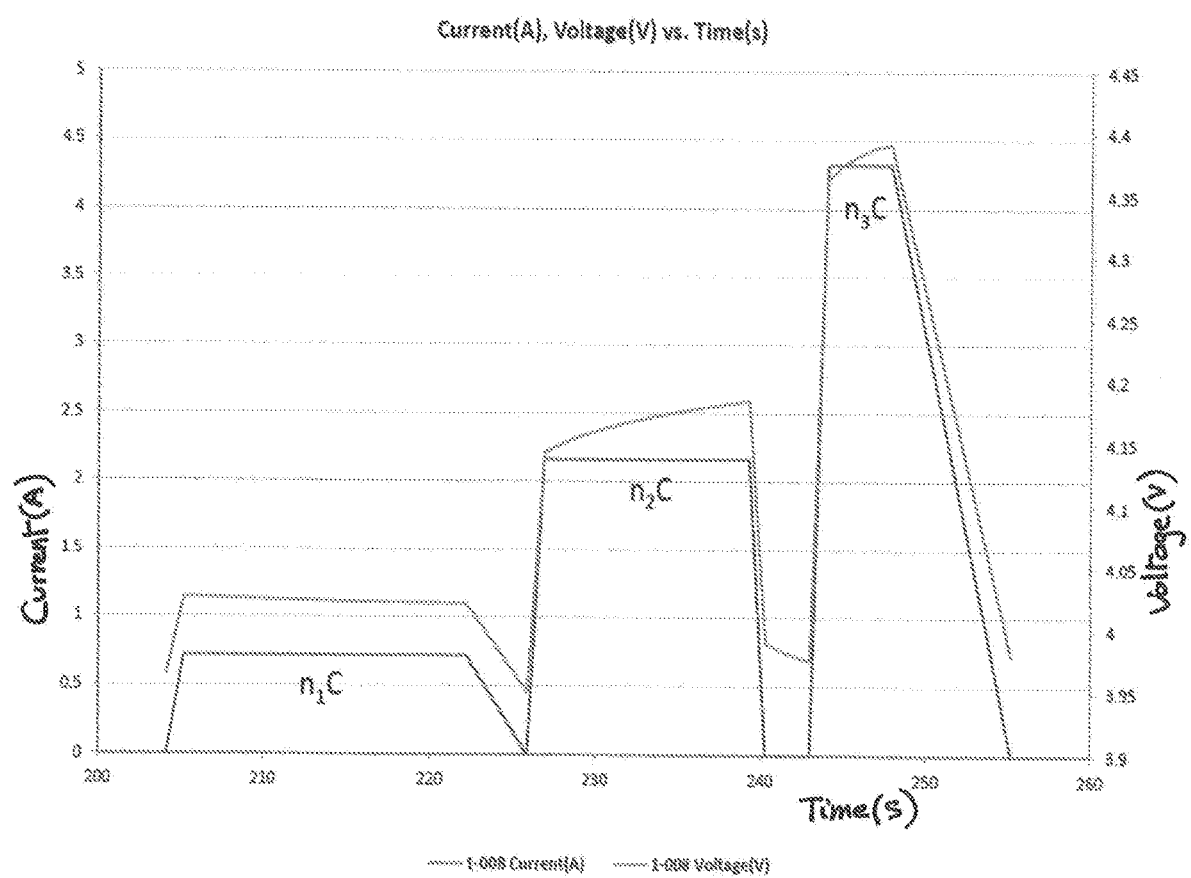
FIG. 4 illustrates current and voltage profiles during a bundle within the charging process according to the present disclosure.
Figure 5:
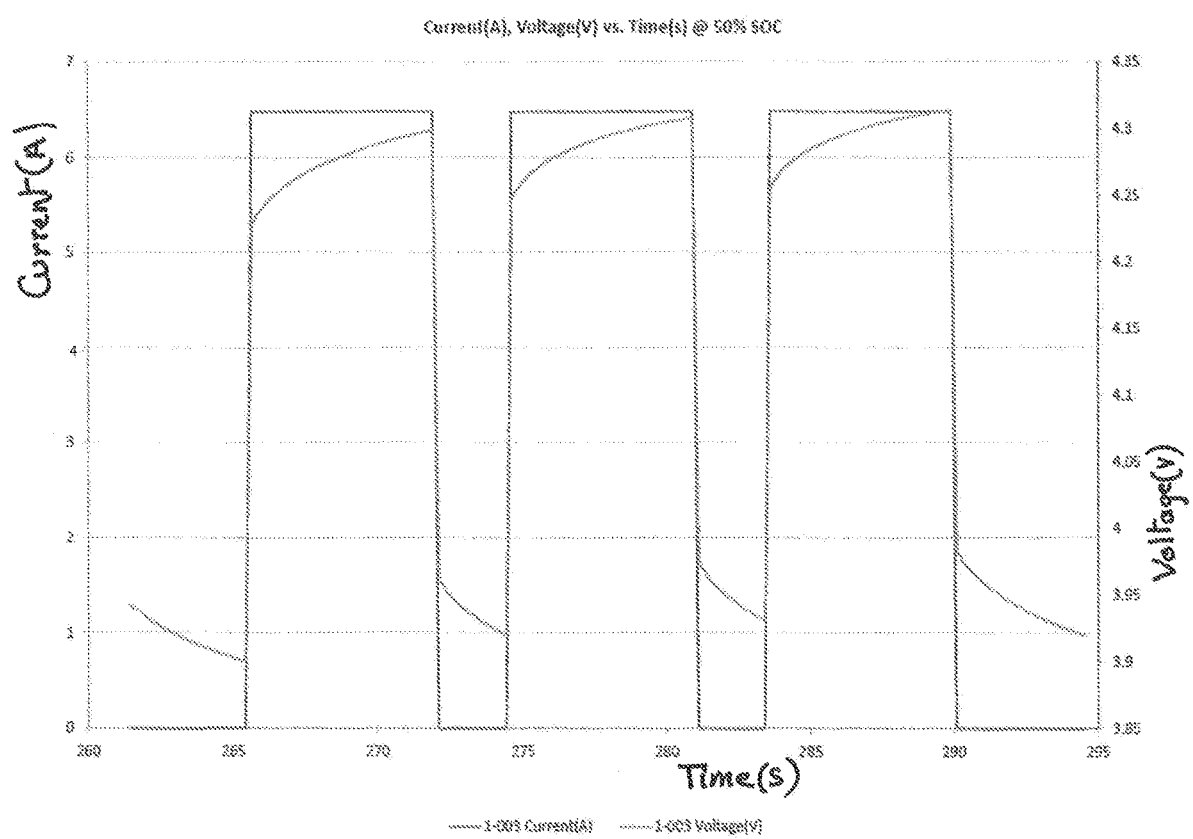
FIG. 5 illustrates current and voltage profiles measured during a first 10-minute charging test with the charging method according to the present disclosure.
Figure 6:
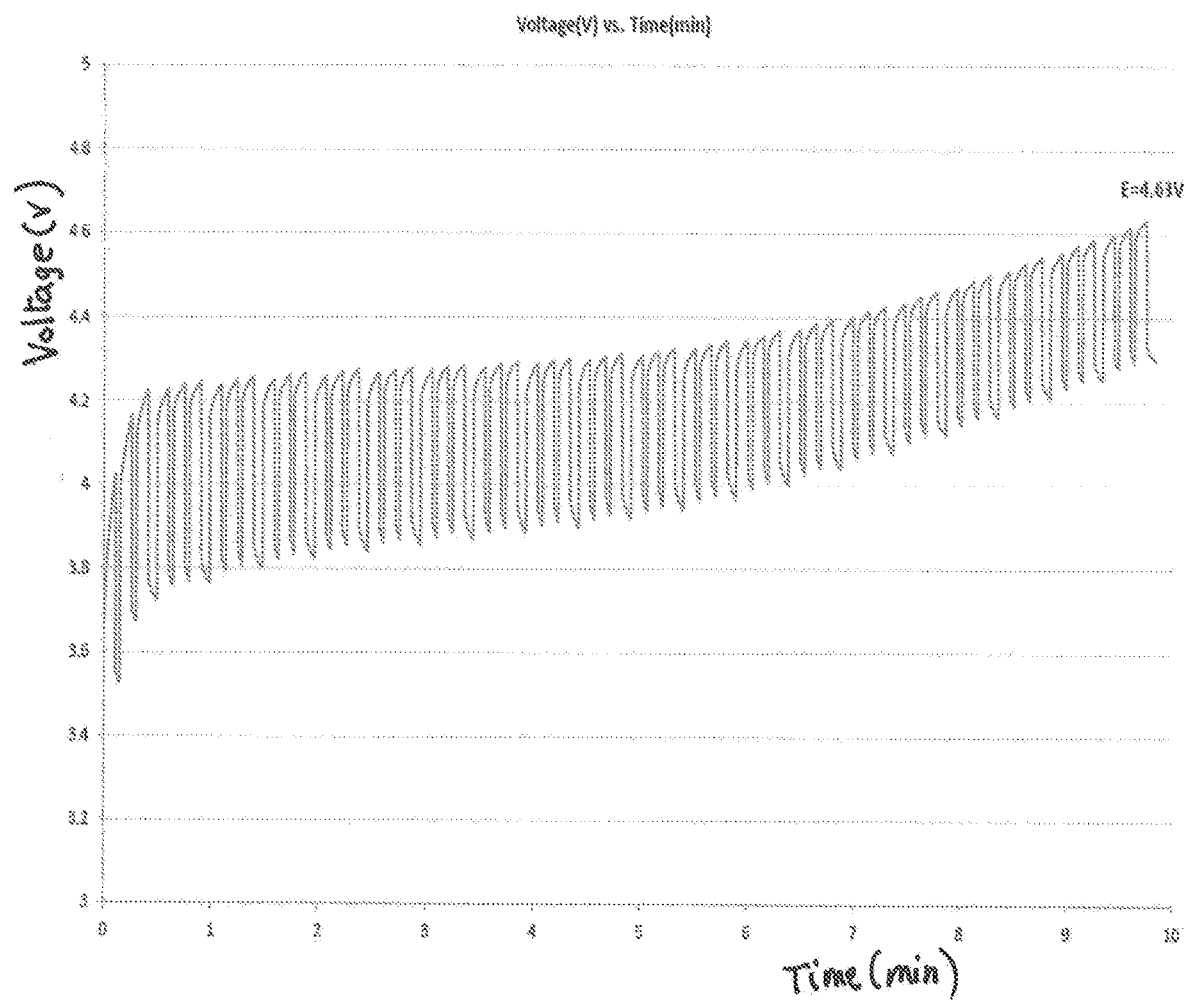
FIG. 6 illustrates an evolution of the charging voltage vs time during the first 10-minute charging test.
Figure 7:
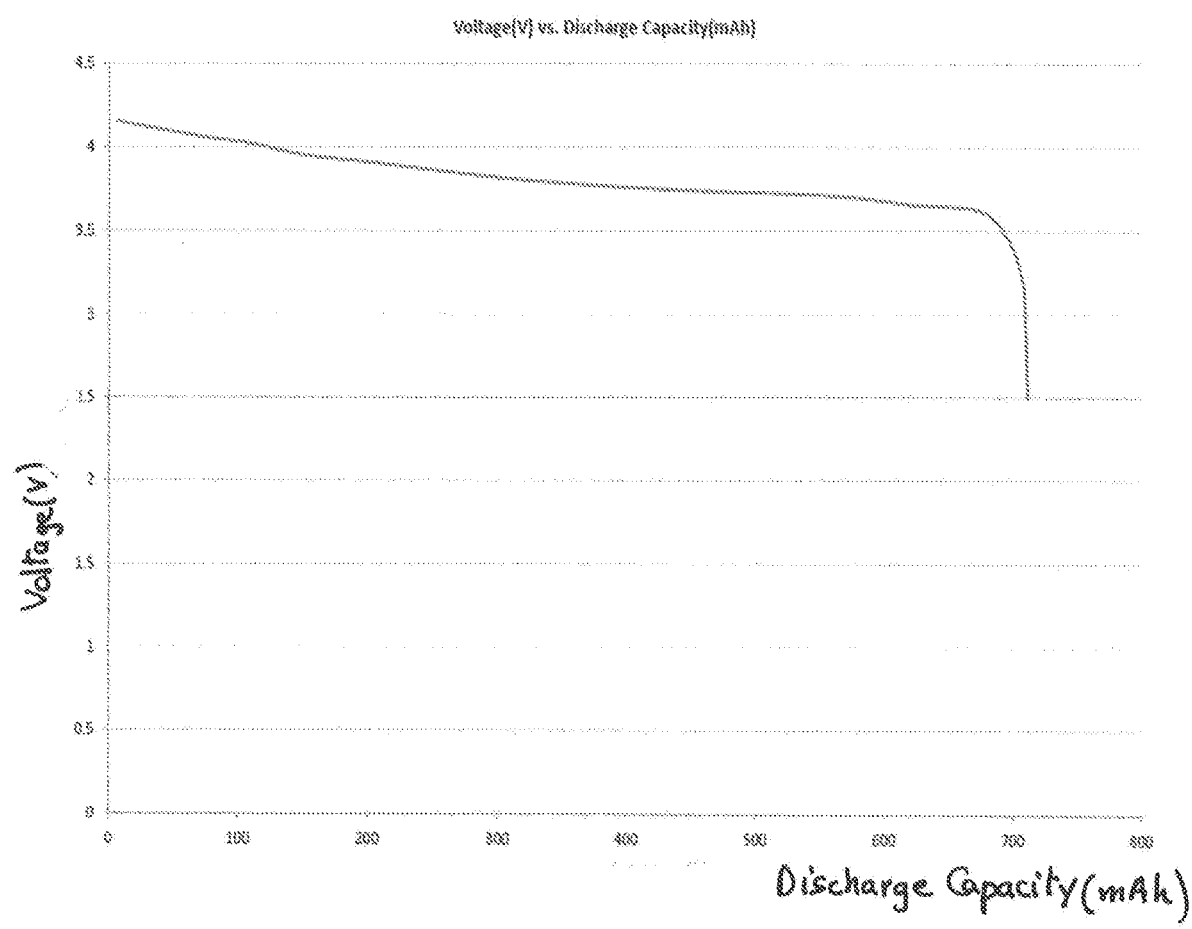
FIG. 7 illustrates an evolution of the charging voltage vs the discharge capacity during the first 10-minute charging test.
Figure 8:
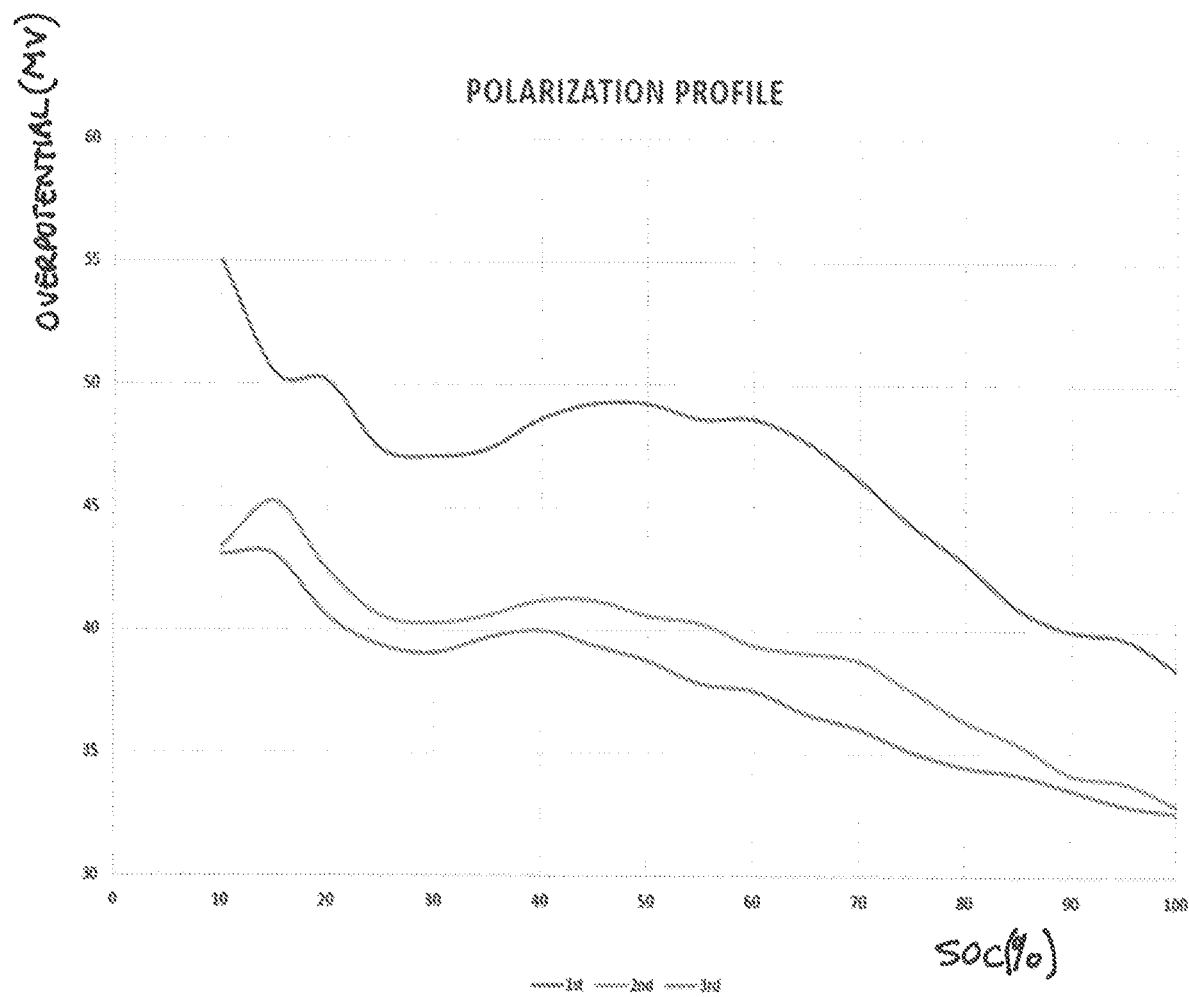
FIG. 8 illustrates a polarization profile measured during the first 10-minute charging test.
Figure 9:
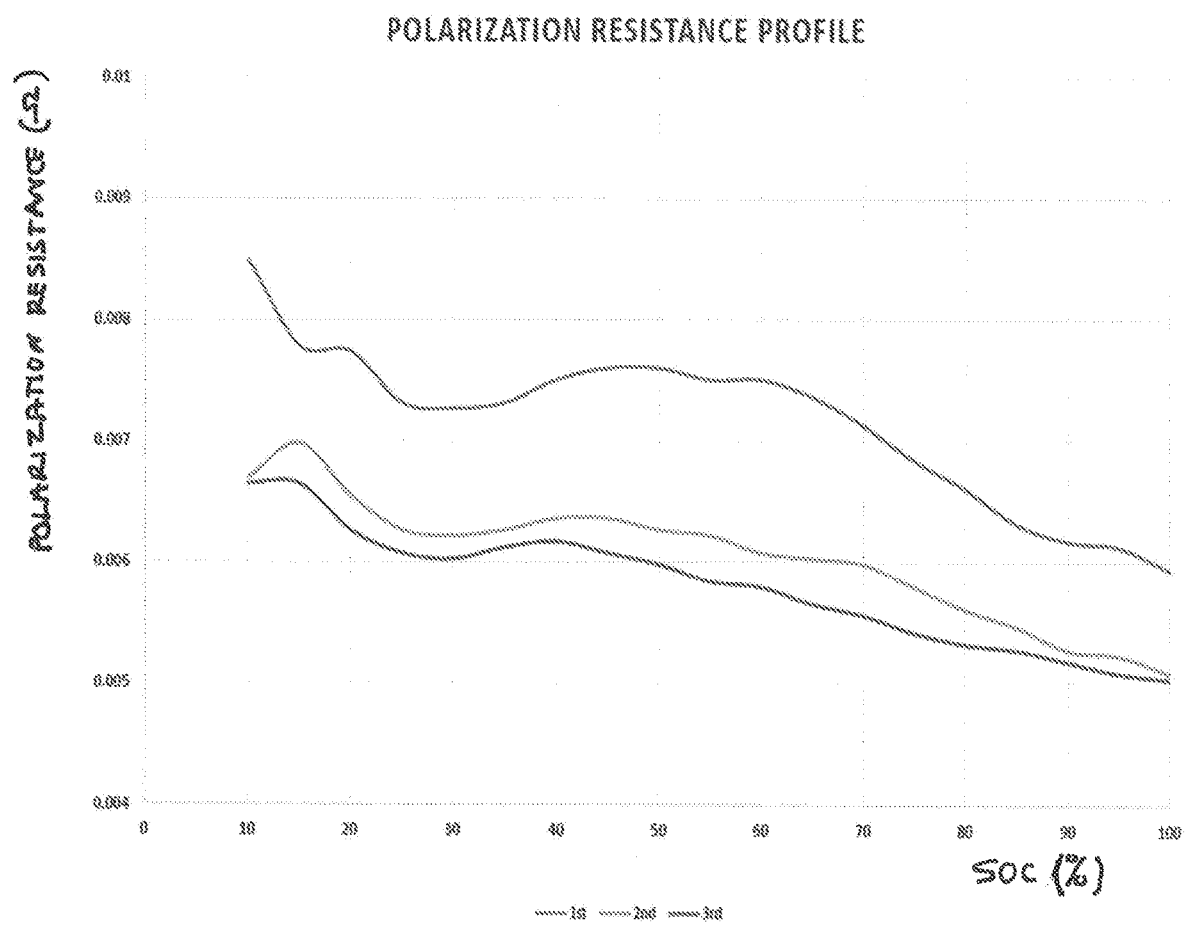
FIG. 9 illustrates a polarization resistance profile measured during the first 10-minute charging test.
Figure 10:
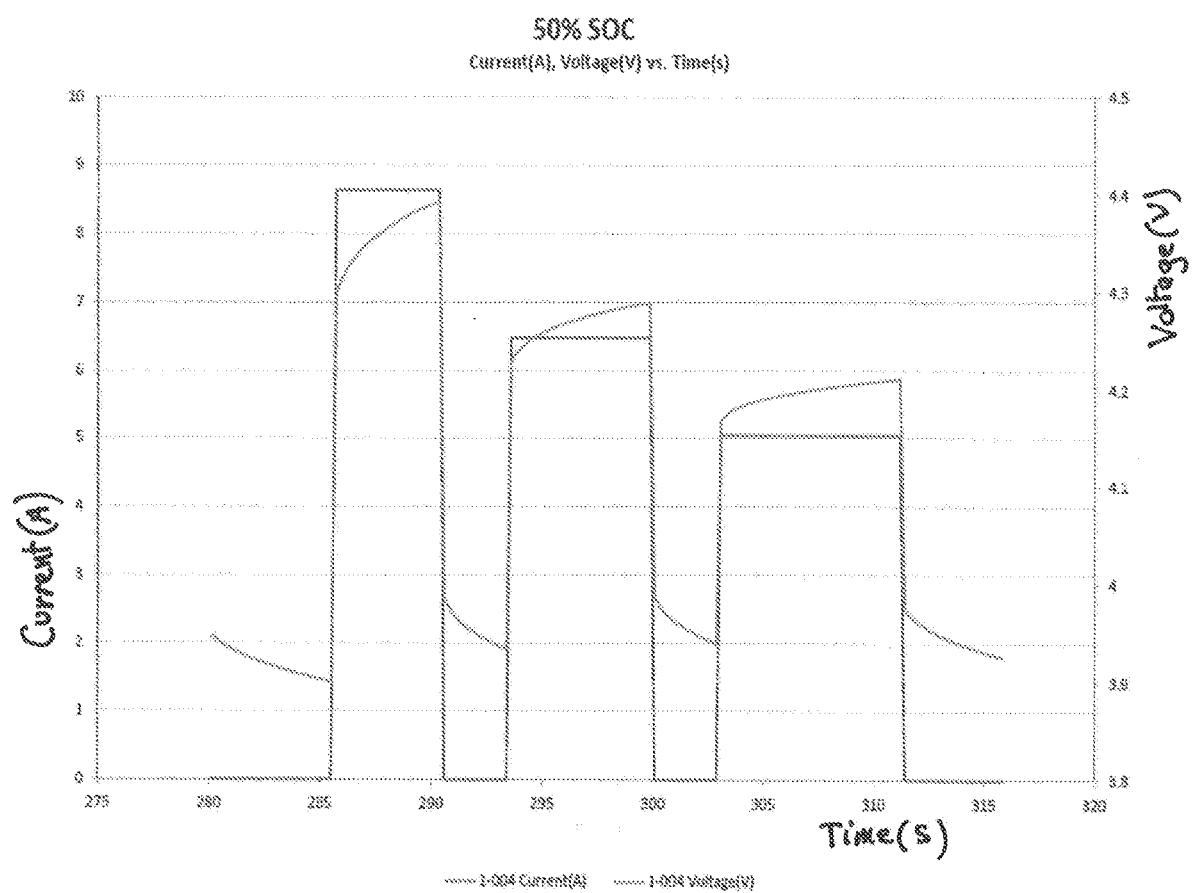
FIG. 10 illustrates voltage and current profiles measured at a 50% SOC during a second 10-minute charging test.
Figure 11:
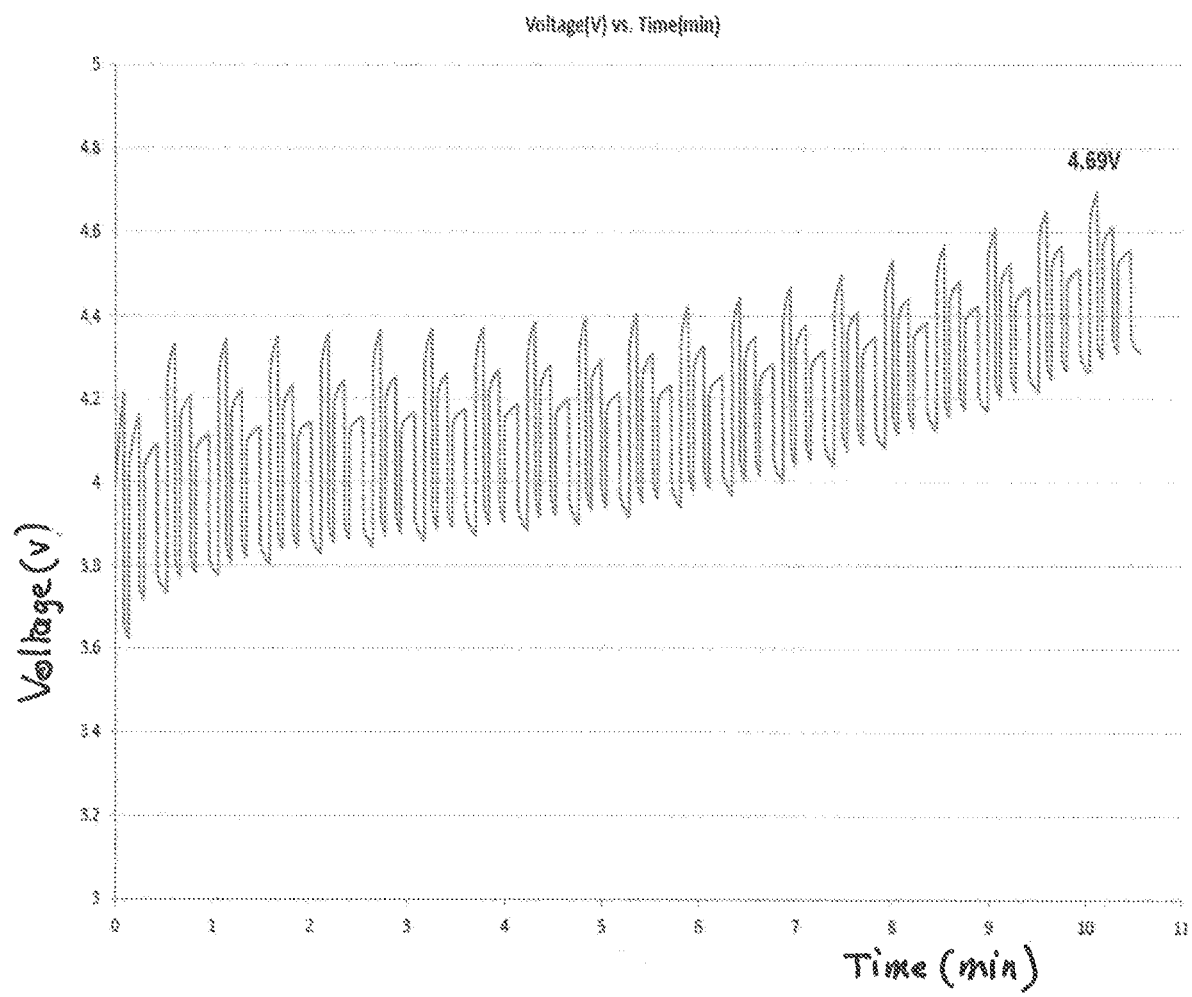
FIG. 11 illustrates the evolution of voltage vs time during the second 10-minute charging test.
Figure 12:
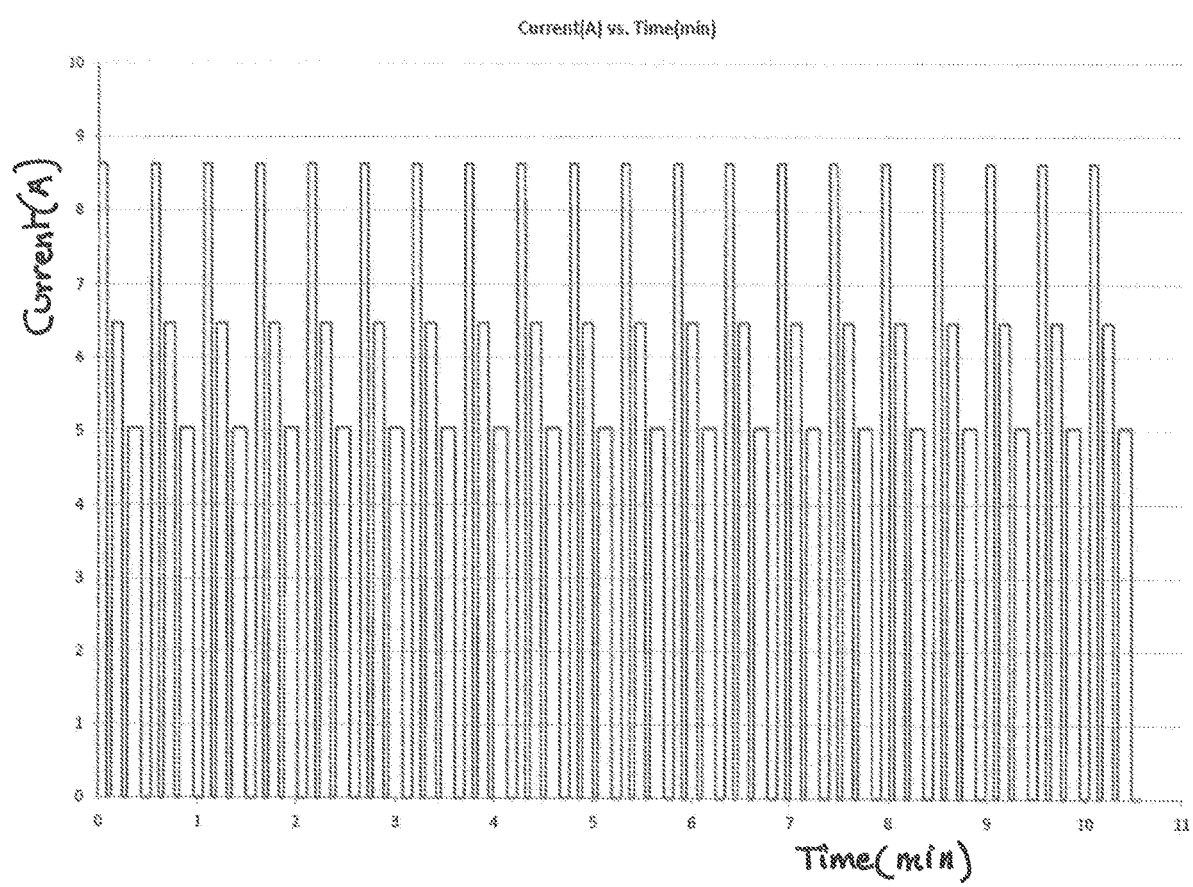
FIG. 12 illustrates the evolution of current vs time during the second 10-minute charging test.
Figure 13:
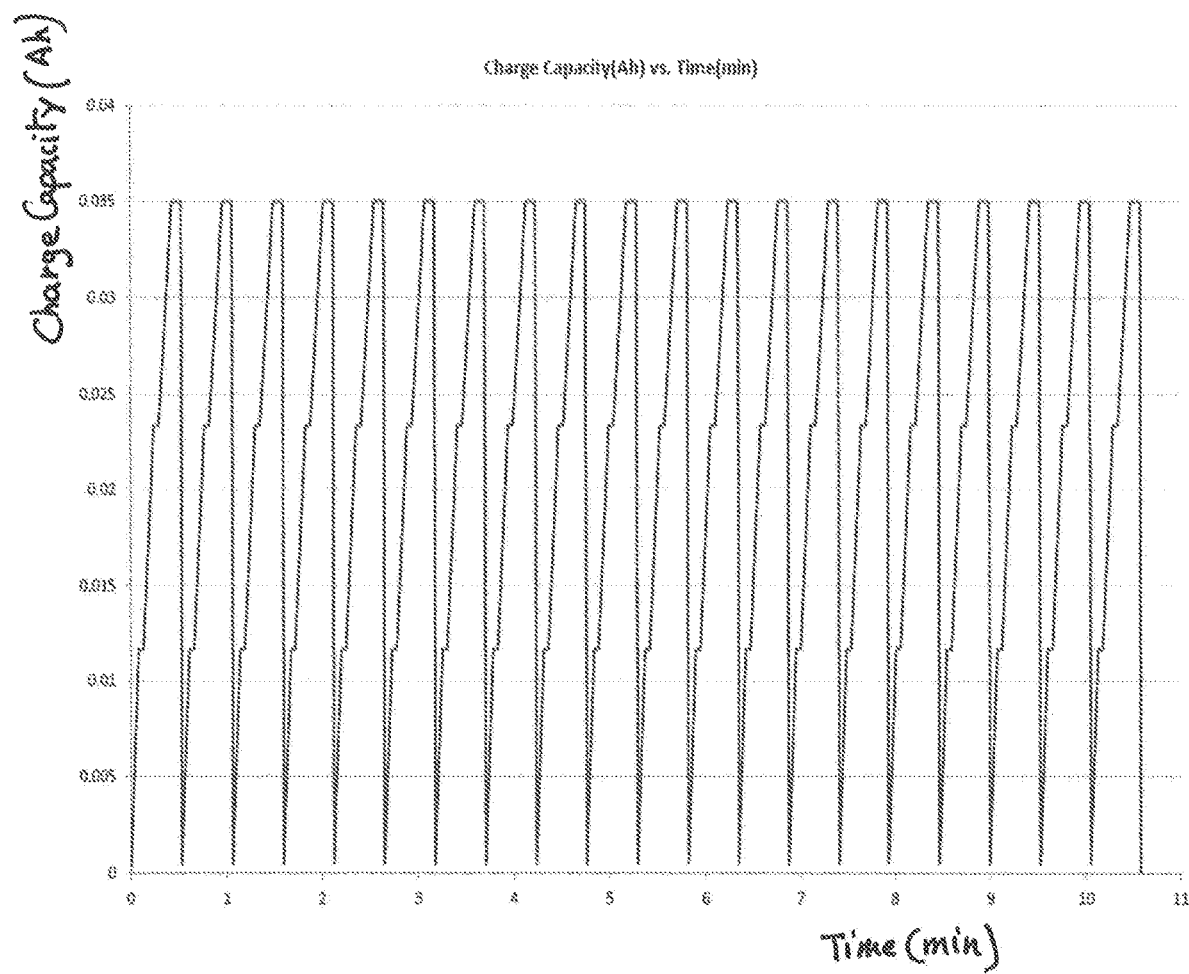
FIG. 13 illustrates the evolution of charge capacity vs time during the second 10-minute charging test.
Figure 14:
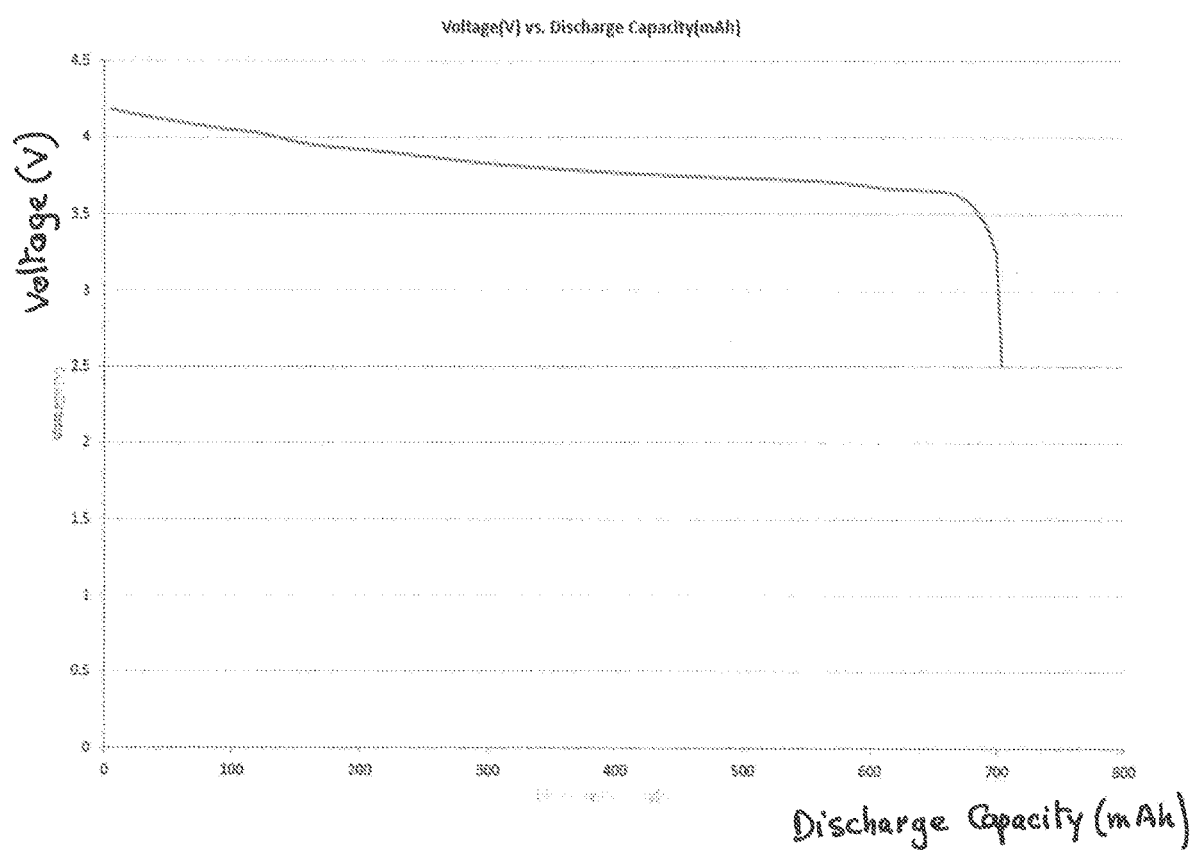
FIG. 14 illustrates the evolution of voltage vs discharge capacity during the second 10-minute charging test.
Figure 15:
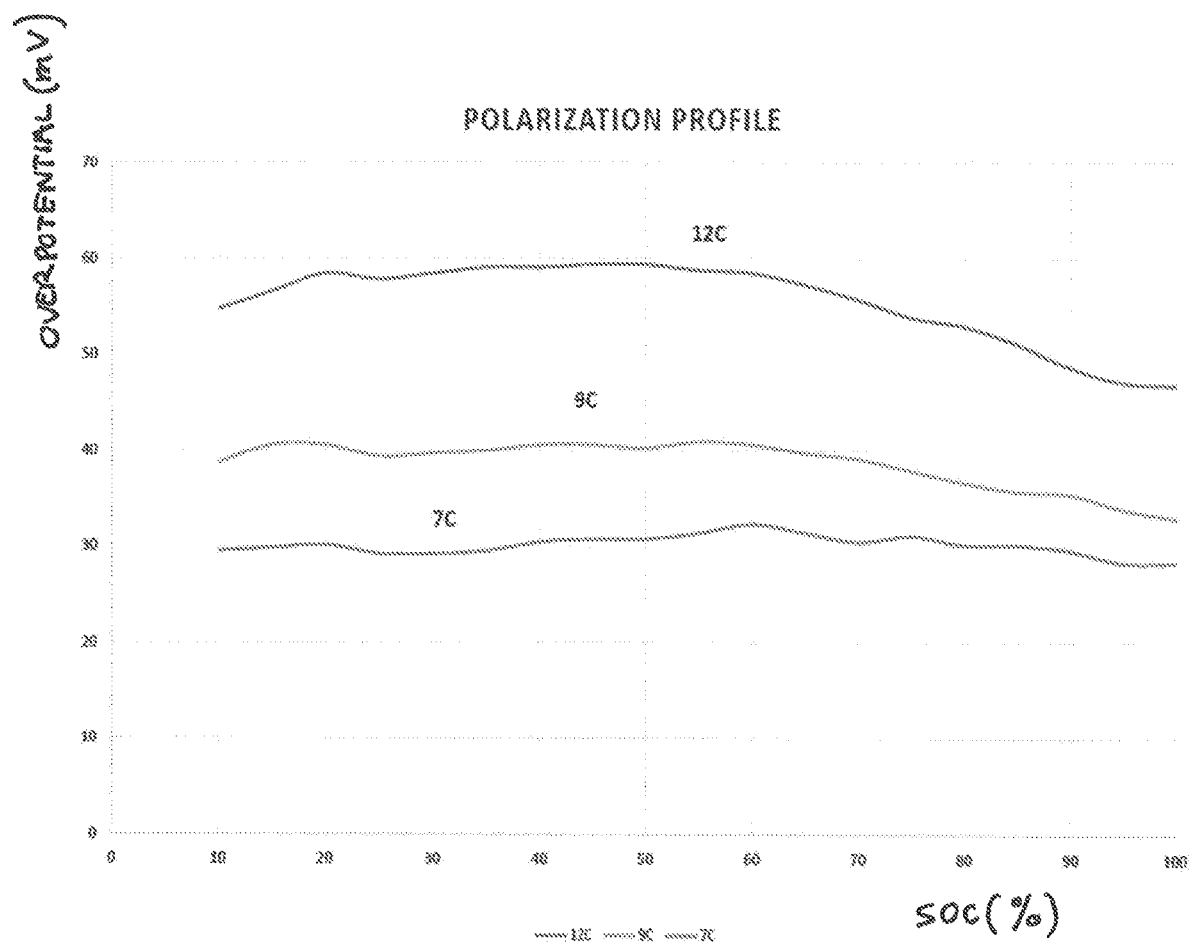
FIG. 15 illustrates a polarization profile measured during the second 10-minute charging test.
Figure 16:
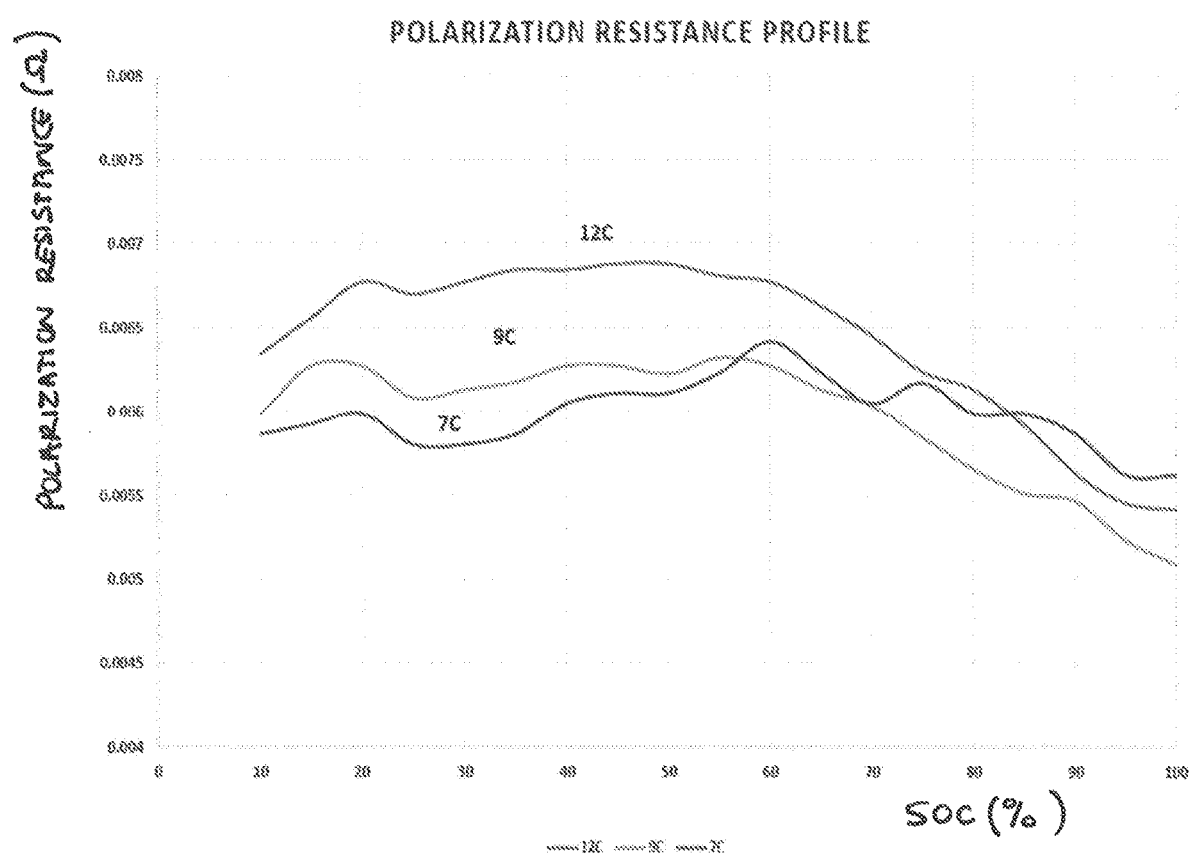
FIG. 16 illustrates a polarization resistance profile measured during the second 10-minute charging test.
Figure 17:
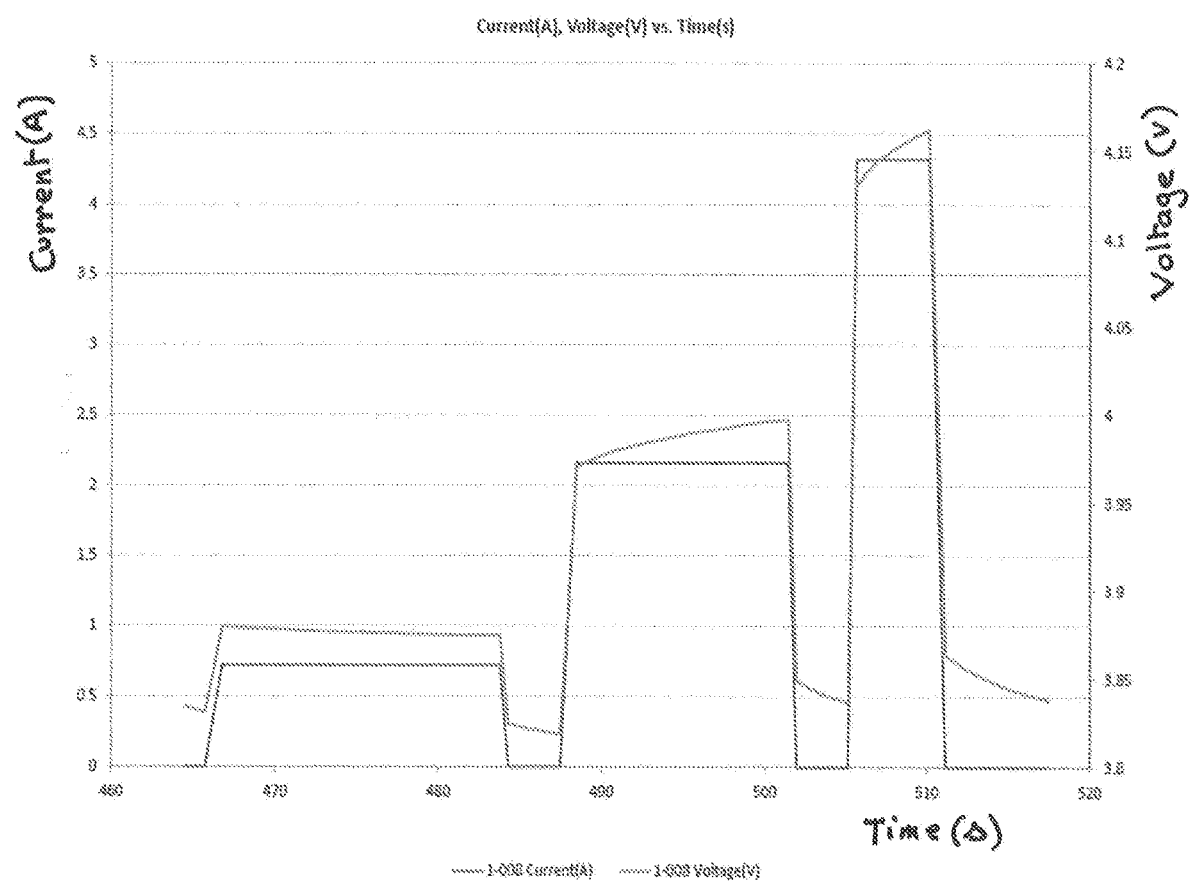
FIG. 17 illustrates voltage and current profiles measured during a first 15-minute charging test.
Figure 18:
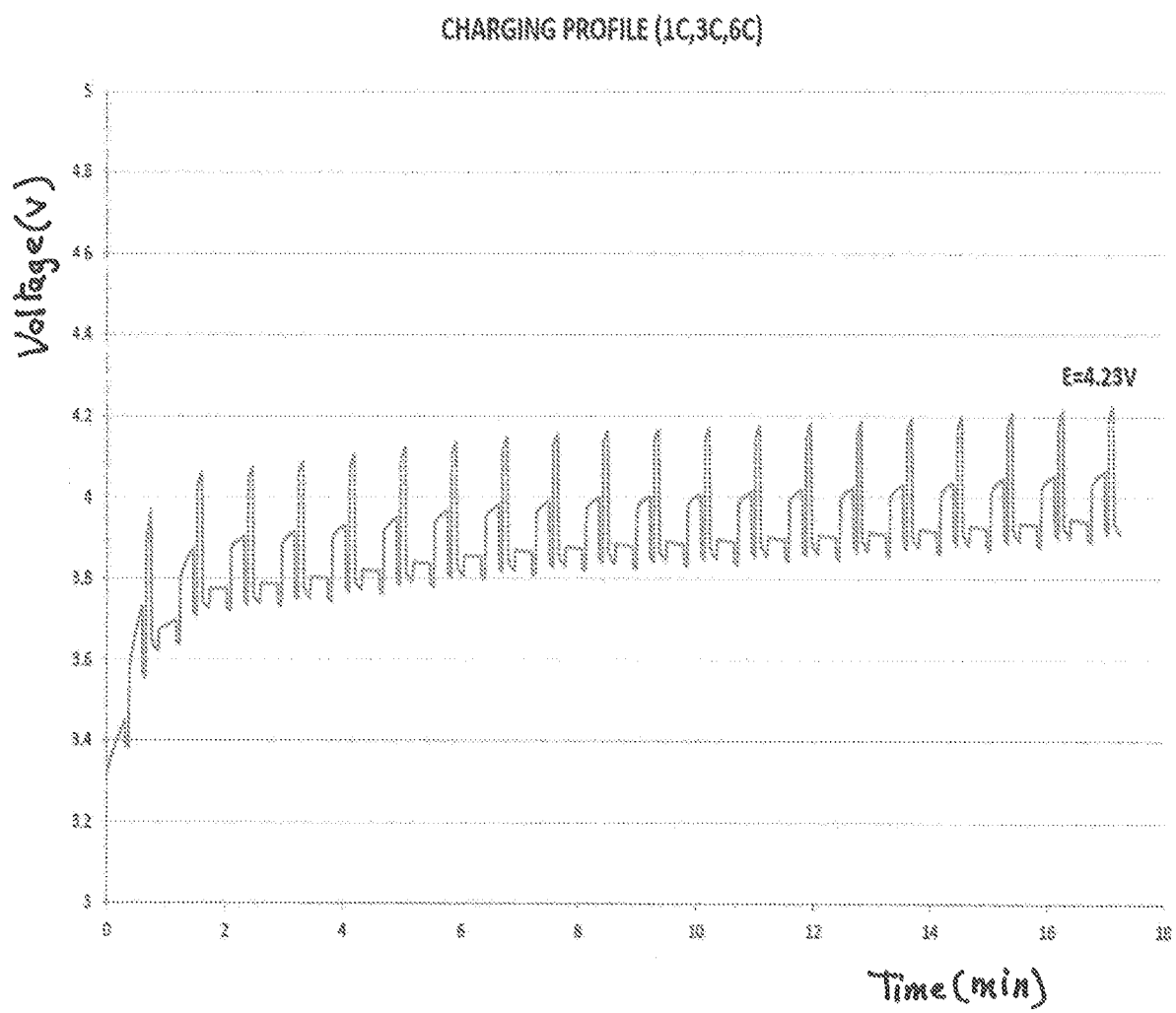
FIG. 18 illustrates a charging profile measured during the first 15-minute charging test.
Figure 19:
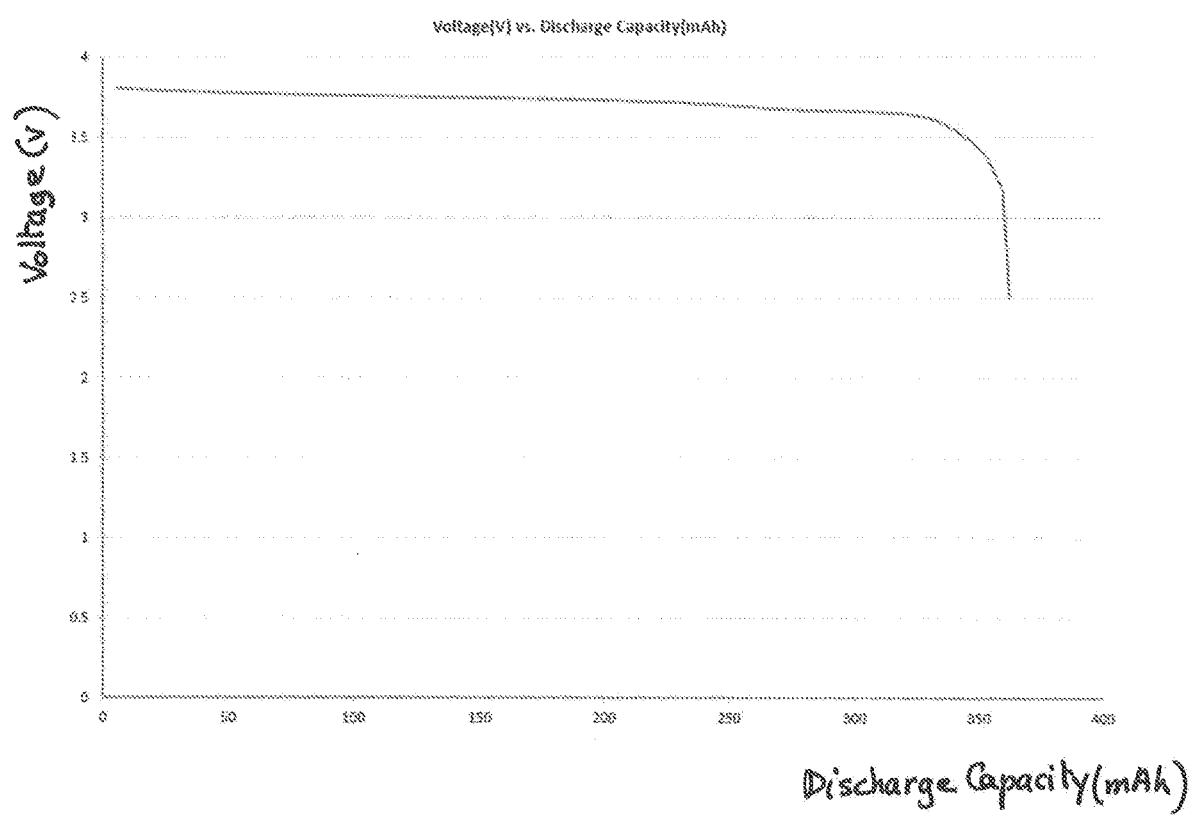
FIG. 19 illustrates an evolution of voltage vs discharge capacity measured during the first 15-minute charging test.
Figure 20:
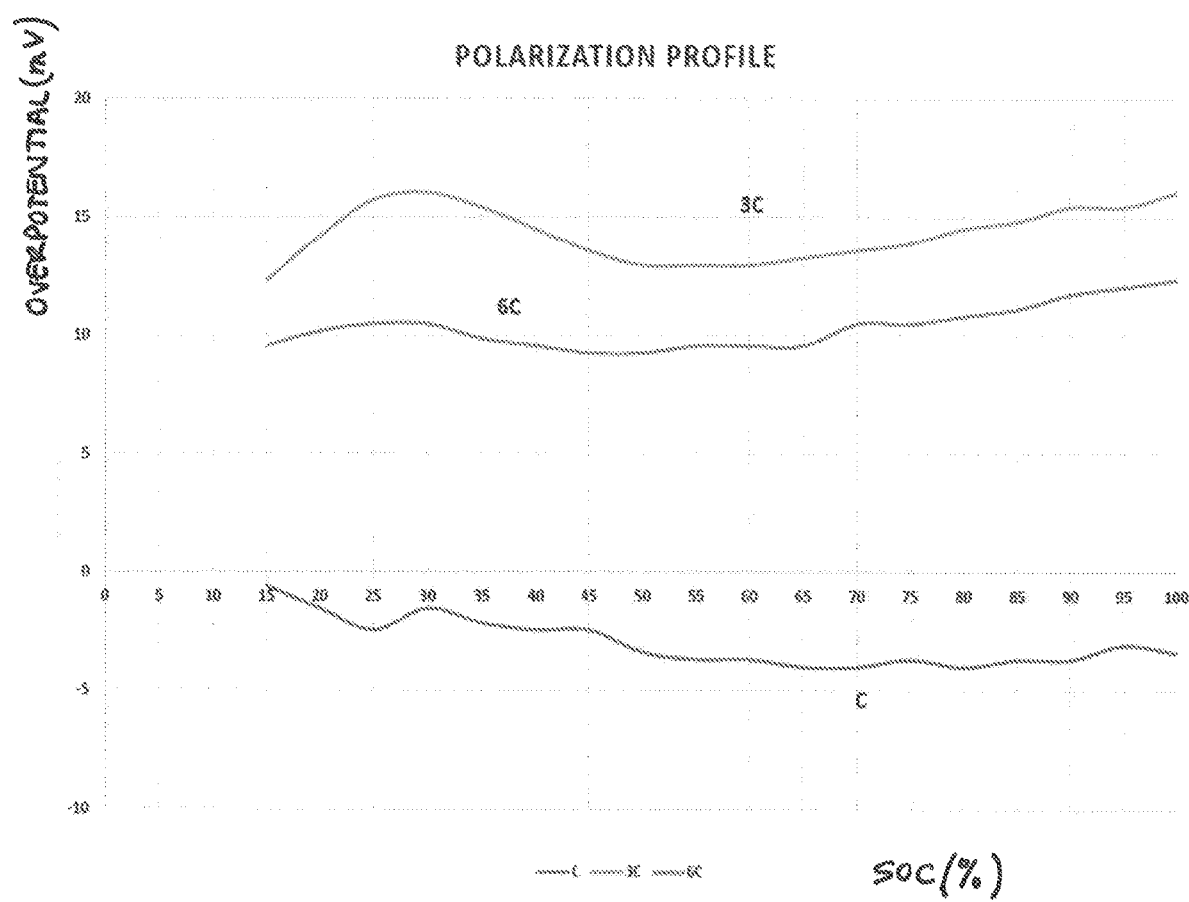
FIG. 20 illustrates a polarization profile measured during the first 15-minute charging test.
Figure 21:
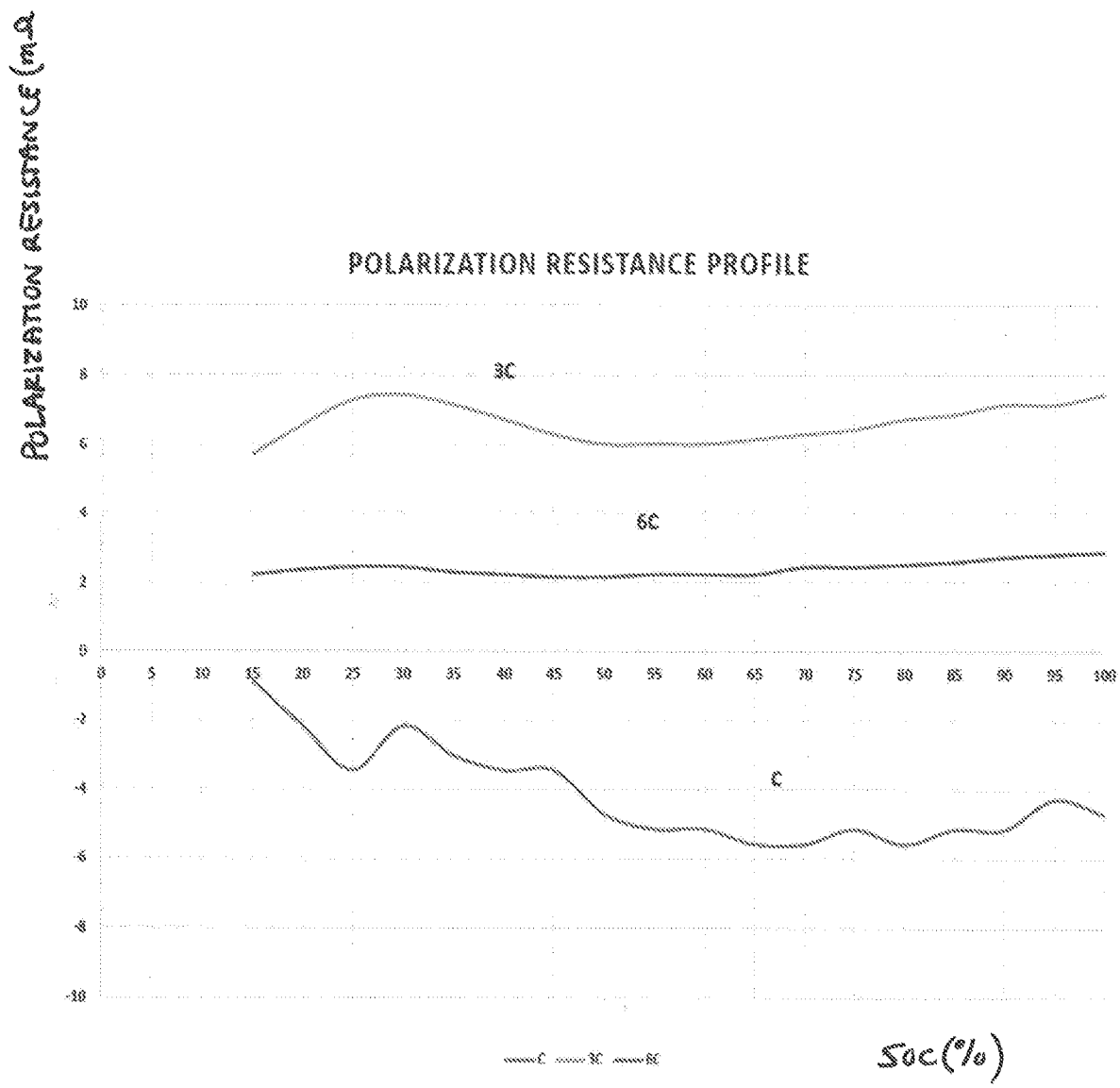
FIG. 21 illustrates a polarization resistance profile vs SOC measured during the first 15-minute charging test.
Figure 22:
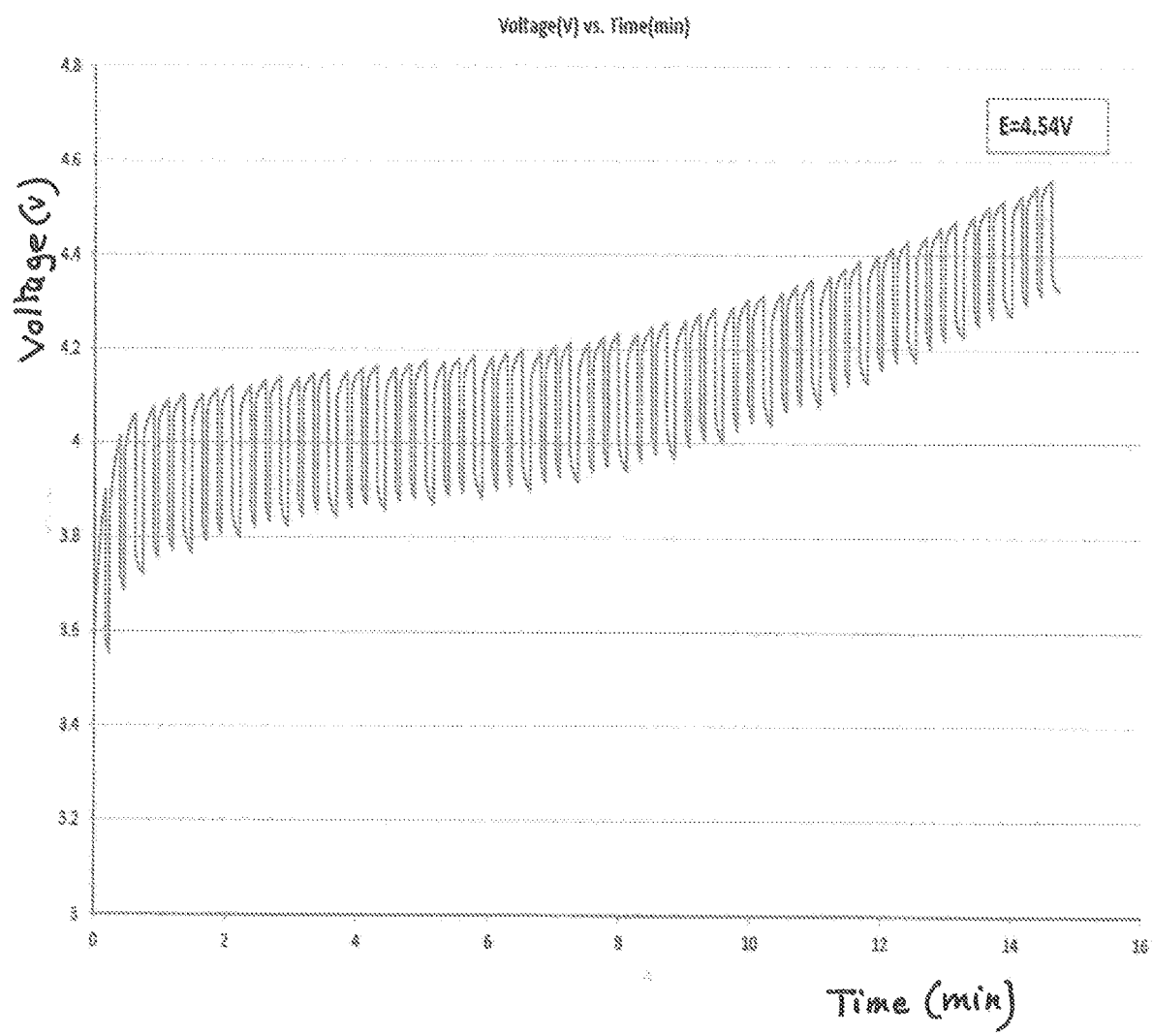
FIG. 22 illustrates voltage variation vs time, measured during a second 15-minute charging test.
Figure 23:
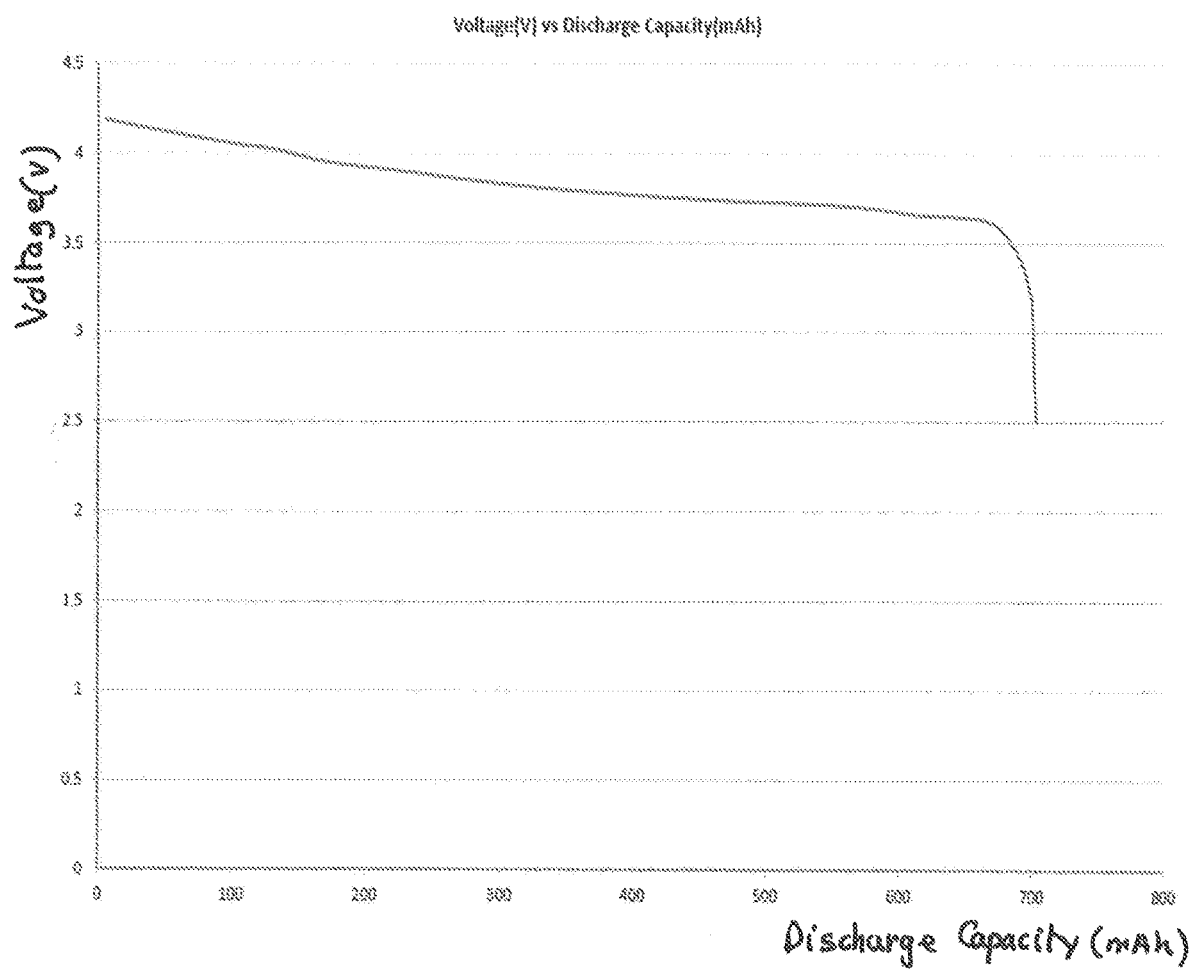
FIG. 23 illustrates an evolution of voltage vs discharge capacity during the second 15-minute charging test.
Figure 24:
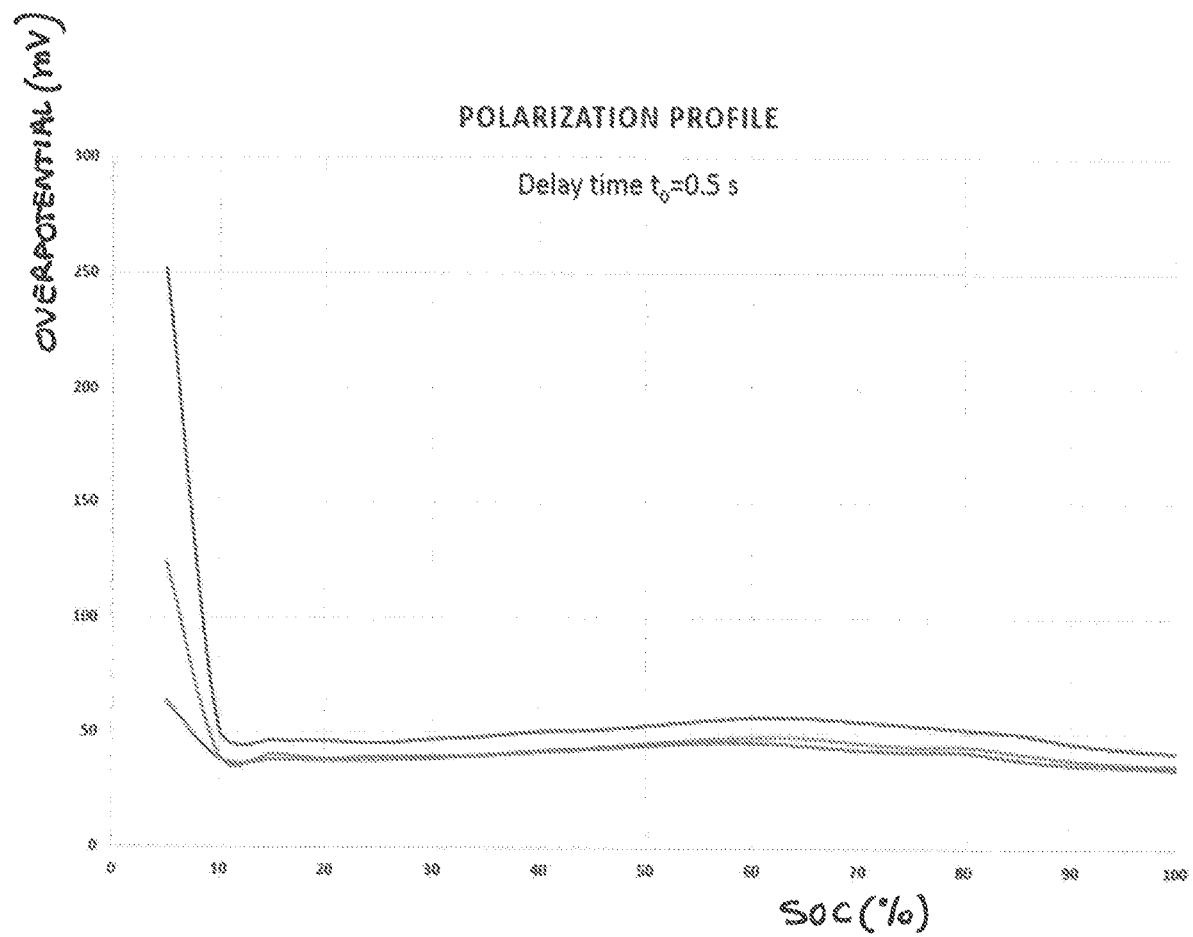
FIG. 24 illustrates a polarization profile with a delay time of 0.5 s, during the second 15-minute charging test.
Figure 25:
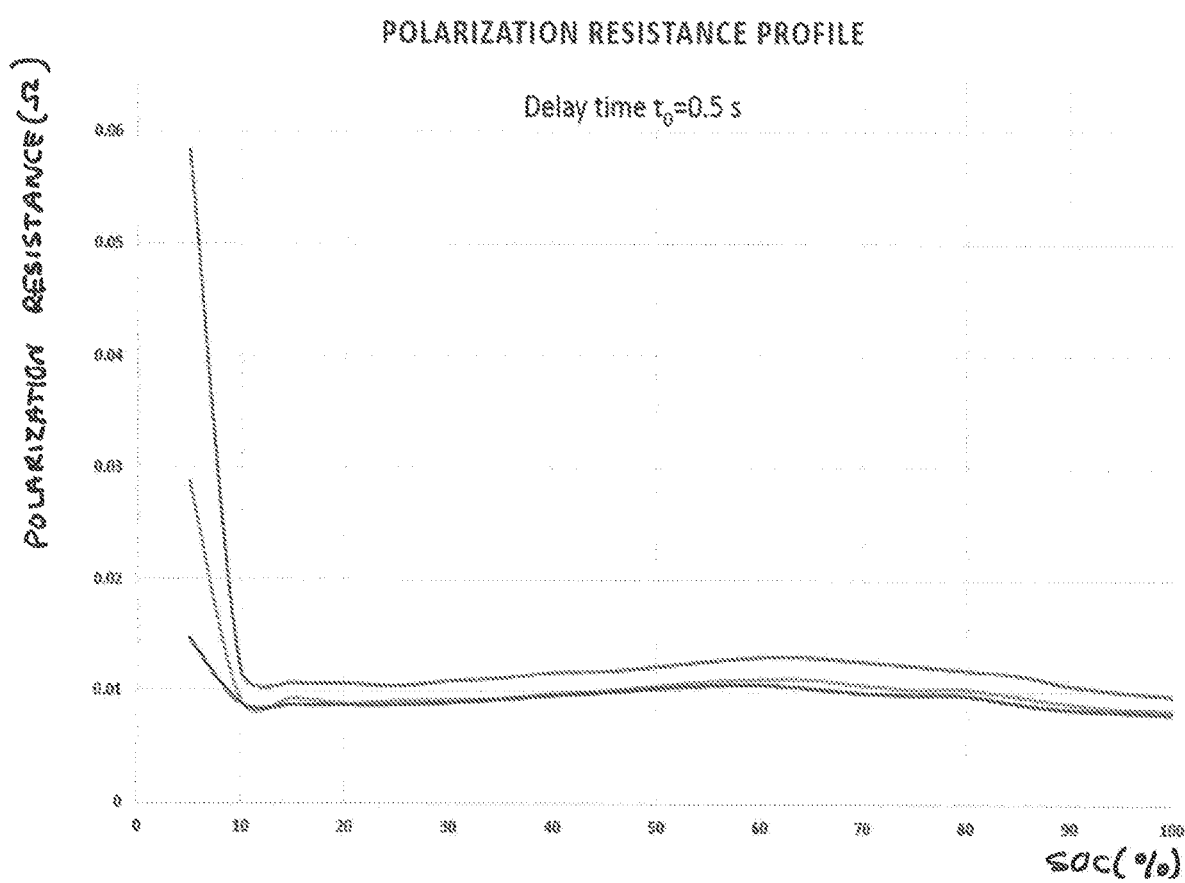
FIG. 25 illustrates a polarization resistance profile with a delay time of 0.5 s, during the second 15-minute charging test.
Figure 26:
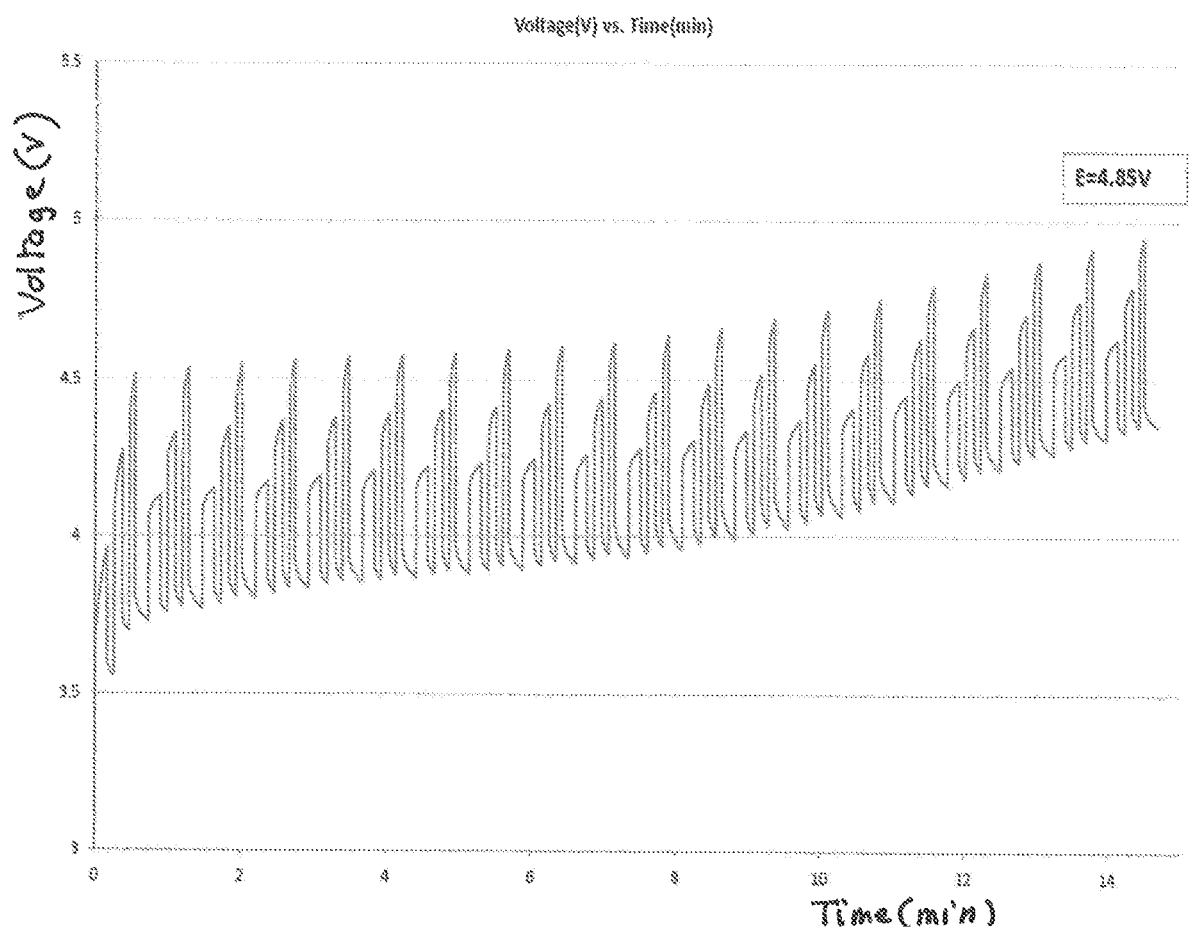
FIG. 26 illustrates voltage vs time, measured during a third 15-minute charging test.
Figure 27:
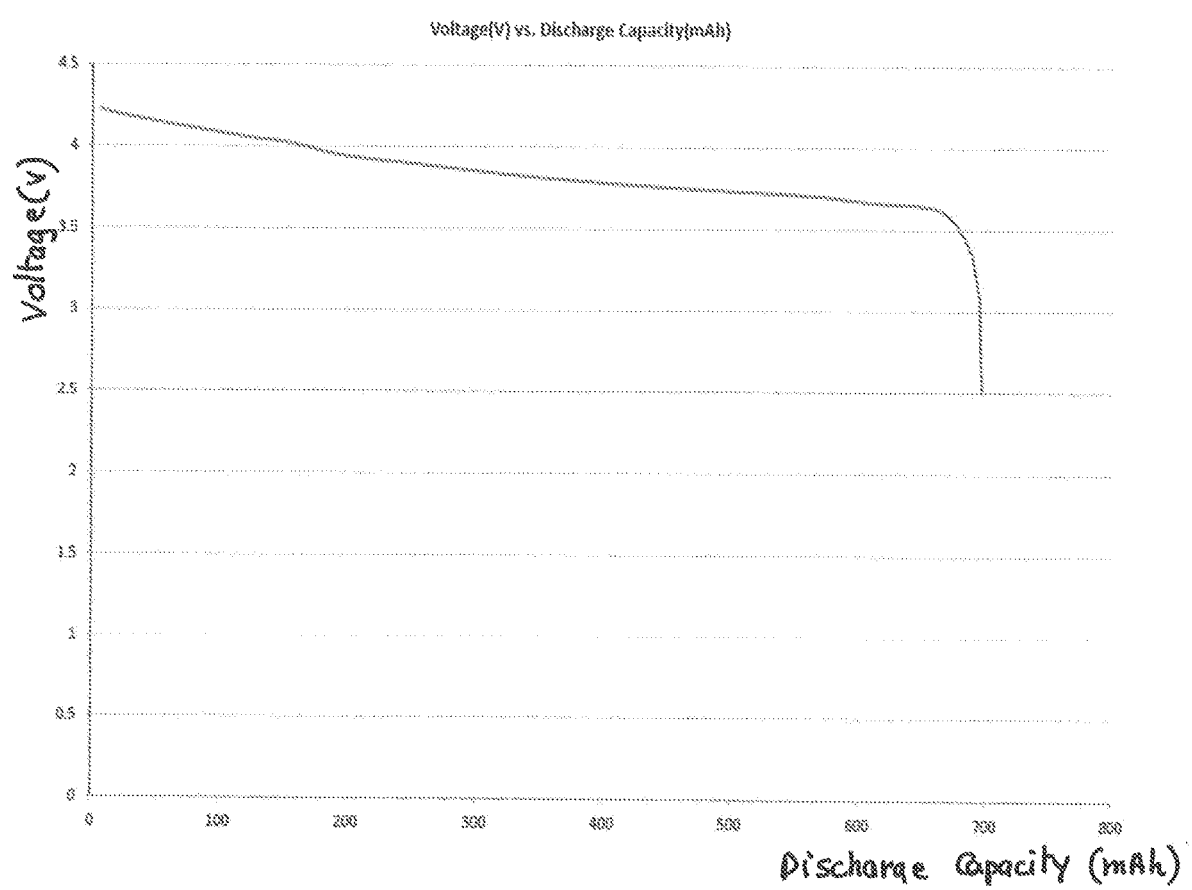
FIG. 27 illustrates voltage variation vs discharge capacity measured during the third 15-minute charging test.
Figure 28:
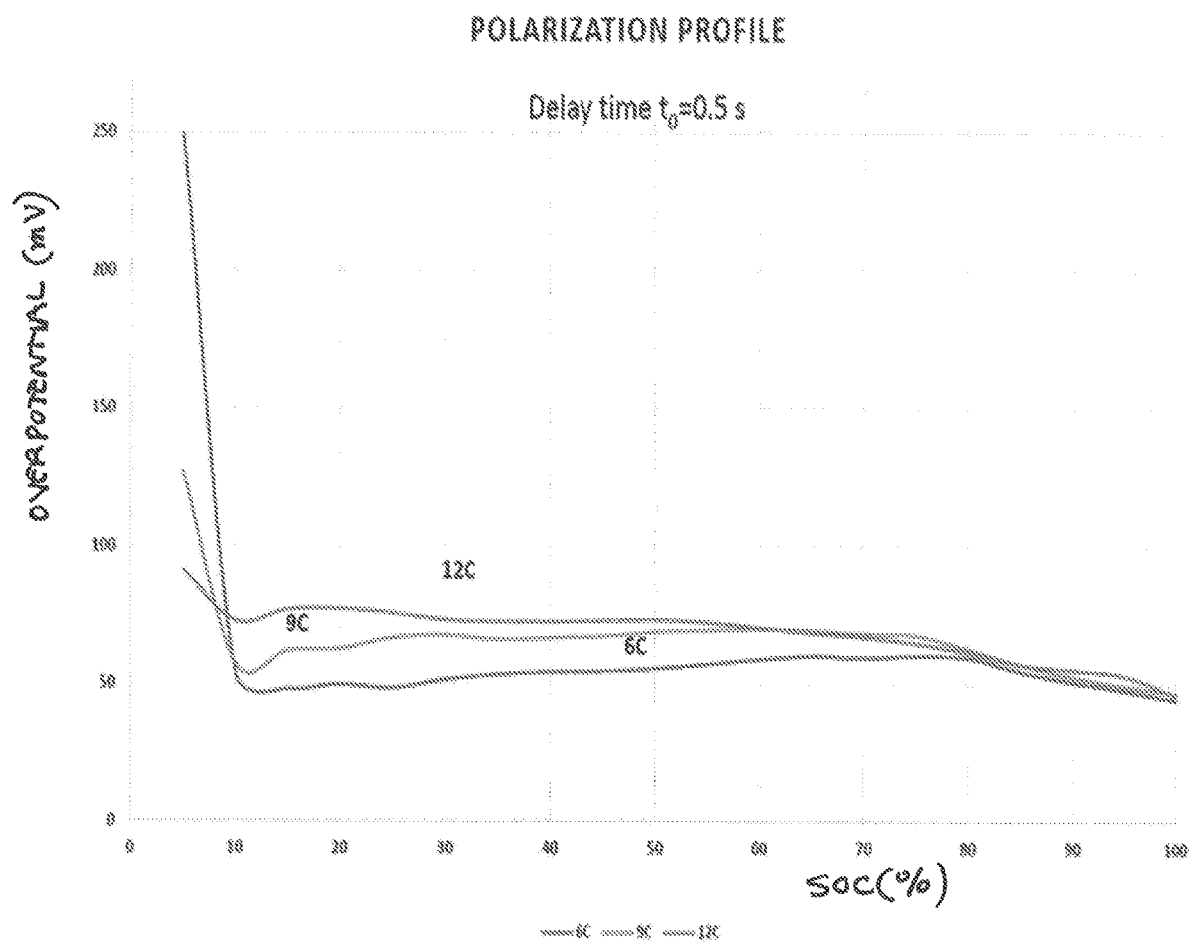
FIG. 28 illustrates a polarization profile measured during the third 15-minute charging test.
Figure 29:
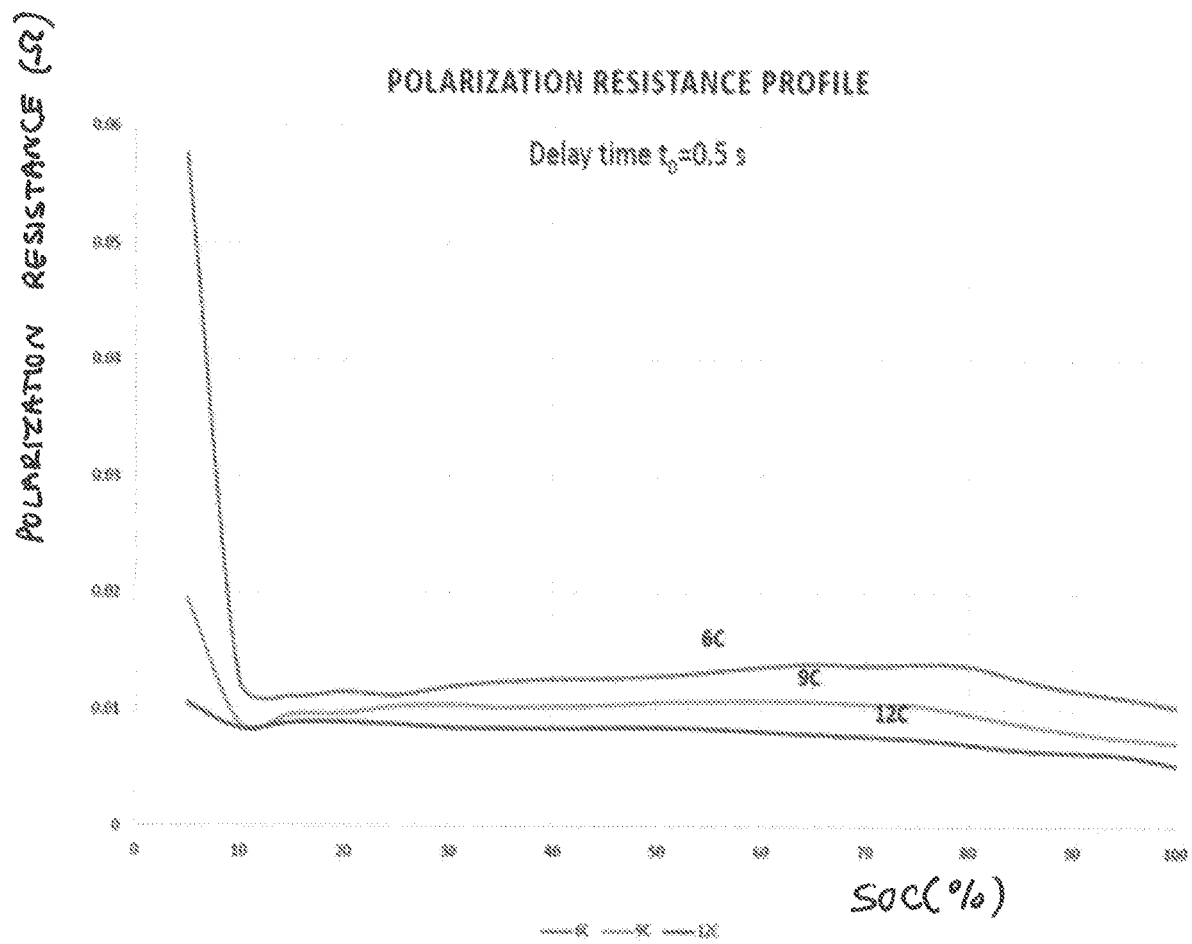
FIG. 29 illustrates a polarization resistance profile measured during the third 15-minute charging test.
Figure 30:
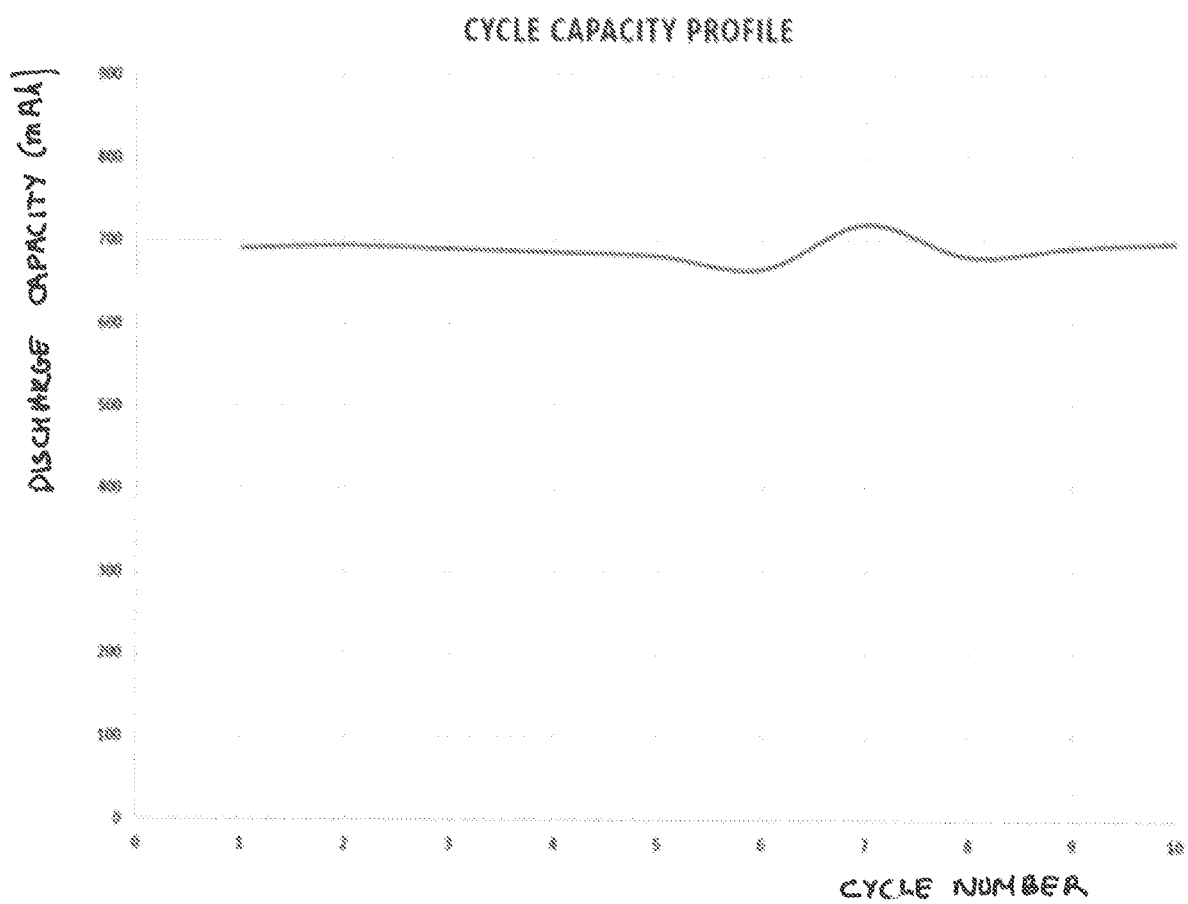
FIG. 30 illustrates a cycle capacity profile measured during the third 15-minute charging test.

Current and voltage profiles during a bundle are illustrated by FIG. 4.

The following examples are given to illustrate the CPC concept. In these examples:

the number of pulses in each bundle is $P_k=3$ the C-rate of each pulse $n_{i,k}$ is either increasing, decreasing or constant the increase in SOC (State of Charge) after each pulse is $$\delta_{i,k}(\%) = n_{i,k} \frac{\tau_{i,k}}{36} = \frac{5}{3}\%$$

the increase in SOC after each bundle is $d_k(\%)=5\%$ the number of bundles to achieve full charge from 0 to 100% SOC is N=20 the end of charge voltage is <4.9 V

CPC test data illustrated below include

Bundles parameters

Discharge profile

Polarization profiles

Polarization resistance profile

A first 10-minute charging test implementing the charging method according to the present disclosure is now described with reference to FIGS. 5-9, with the following test condition:

| Total Test Time | Time taken | | | Rest Time after every C-rate | Rest time after every 5% | Discharge Capacity (mAh) | Charge Capacity (mAh) | Efficiency (%) |
|---|---|---|---|---|---|---|---|---|
| | 9 C | 9 C | 9 C | | | | | |
| ~10 min | 6.67 s | 6.67 s | 6.67 s | 2.5 s | 5 s | 711 | 700 | 101.57 |

A second 10-minute charging test implementing the charging method according to the present disclosure is now described with reference to FIGS. 10-16, with the following test condition:

| Cell Number | Total Test Time | Time taken | | | Rest Time after every C-rate | Rest time after every 5% | Discharge Capacity (mAh) | Charge Capacity (mAh) | Efficiency (%) |
|---|---|---|---|---|---|---|---|---|---|
| | | 12 C | 9 C | 7 C | | | | | |
| 50 | ~10 min | 5 s | 6.67 s | 8.57 s | 3 s | 6 s | 704 | 700 | 100.57 |

The following table summarizes the main experimental results obtained with the two above-cited tests:

| Test # | C1 | C2 | C3 | Discharge capacity $Q_d$ (MAh) |
|---|---|---|---|---|
| 1-1 | 9C | 9C | 9C | 709 |
| 1-2 | 12C | 9C | 7C | 704 |

A group of experimental tests corresponding to 15 minutes charging is now described with reference to FIGS. 17-21.

A first 15-minute charging test has been done with the following test conditions:

| | Time taken | | | Rest Time after every C-rate | Rest time after every 5% |
|---|---|---|---|---|---|
| | 1C | 3C | 6C | | |
| Total Test Time | | | | | |
| ~15 minutes | 17 s | 13 s | 4 s | 3.666 s | 7.333 s |

A second 15-minute charging test has been done with the following test conditions:

| | Time taken | | | Rest Time after every C-rate | Rest time after every 5% |
|---|---|---|---|---|---|
| | 6C | 6C | 6C | | |
| Total Test Time | | | | | |
| ~15 minutes | 10 s | 10 s | 10 s | 3.75 s | 7.5 s |

A third 15-minute charging test has been done with the following test conditions:

| | Time taken | | | Rest Time after every C-rate | Rest time after every 5% |
|---|---|---|---|---|---|
| | 6C | 9C | 12C | | |
| Total Test Time | | | | | |
| ~15 minutes | 10 s | 6.67s | 5s | 5.75s | 11.5 s |

A fourth 15-minute charging test has been done with the following test conditions:

| | Time taken | | | Rest Time after every C-rate | Rest time after every 5% |
|---|---|---|---|---|---|
| | 12C | 9C | 6C | | |
| Total Test Time | | | | | |
| ~15 minutes | 10 s | 6.67s | 5s | 5.75s | 11.5 s |

The following Table summarizes the main results obtained from these four tests and illustrated by FIGS. 22-30.

| Summary-2 | | | | |
|---|---|---|---|---|
| Test # | C1 | C2 | C3 | Discharge capacity $Q_d$ (MAh) |
| 2-1 | 1C | 3C | 6C | 362 |
| 2-2 | 6C | 6C | 6C | 703 |
| 2-3 | 6C | 9C | 12C | 696 |
| 2-4 | 12C | 9C | 6C | 701 |

Another group of tests has been done with the CPC method according to the present disclosure with charging times varying from about 5 hours to 20 minutes, and the main results are summarized in the table below.

Summary-3

| Test # | Total Charge Time | Pulse duration $\tau_{i,k}$ | | | Rest Time after each Pulse, $\rho_{i,k}$ | Rest time after every 5%, $\omega_{i,k}$ | Discharge Capacity (mAh) |
|---|---|---|---|---|---|---|---|
| | | 1 C | 3 C | 6 C | | | |
| 3-1 | ~5 hours | 17 s | 13 s | 4 s | 3.75 minutes | 7.5 minutes | 710 |
| 3-2 | ~2.5 hours | 17 s | 13 s | 4 s | 1.88 minutes | 3.75 minutes | 708 |
| 3-3 | ~1.25 hours | 17 s | 13 s | 4 s | 56 s | 1.9 minutes | 711 |
| 3-4 | ~37.5 minutes | 17 s | 13 s | 4 s | 28 s | 56 s | 717 |
| 3-5 | ~20 minutes | 17 s | 13 s | 4 s | 8.7 s | 17.3 s | 716 |

The experimental tests implementing the CPC charging protocol according to the present disclosure show, in comparison with the convention CCCV protocol, that
  identical cells were charged in 15 minutes using the CPC protocol, and in 20 minutes using the CCCV protocol at 3 C-rate.
  CPC charging in 15 minutes is safer than CCCV charging in 20 minutes, since with a CCCV charging, cells inflated at 18 cycles and exploded at 20 cycles.

The invention claimed is:

1. A method for fast-charging an electrochemical cell, the method comprising the steps of:
  providing the electrochemical cell, the electrochemical cell presenting an initial state of charge (SOC), and
  providing a time-varying charging voltage to the electrochemical cell, thereby generating a charging current resulting in charging of the electrochemical cell from the initial SOC up to a target value $SOC_f$ for the state of charge,
  real-time determining the state of charge (SOC) of said electrochemical cell,
wherein the step of providing a time-varying charging voltage involves applying N bundles of current pulses in such a way that:
  each bundle k ($1 \leq k \leq N$) comprises a variable number $P_k$ of $i_k$ pulses ($1 \leq i_k \leq P_k$), each $i_k$ pulse in a k bundle being defined by a C-rate equal to $n_{i,k} \cdot C$ and a duration $\tau_{i,k}$, with $n_{i,k}$ as the ratio of the charging current of said $i_k$ pulse to the nominal capacity of said cell,
  at each pulse $i_k$, the state of charge (SOC) is increased from said determined state of charge by $\delta_{ik}$ (%)=$n_{i,k} \cdot \tau_{i,k} M$, with M as a predetermined parameter, two successive current pulse ik and ik+1 in a bundle are separated by a rest time $\rho_{i,k}$ and two successive bundles are separated by a rest time $\omega_k$.

2. The charging method of claim 1, wherein parameters N, M, Pk, $i_k$, $n_{i,k}$, $\tau_{i,k}$, are selected so that:
  at each complete bundle k, the state of charge (SOC) is increased by an amount $\delta_K$ (%)=$\Sigma_{i=1}^{i=P} \delta_{Pi,k}$; and $\Sigma_{k=1}^{k=N} \delta_k = SOC_f$.

3. The charging method of claim 2, wherein $\tau_{i,k}$ is between 1 s and 120 s.

4. The charging method of claim 2, wherein the M parameter is determined as equal to 36.

5. The charging method of claim 2, wherein the amount of SOC increase is in a range extending from 20% to 100%.

6. The charging method of claim 2, wherein the parameters N, M, $P_k$, $i_k$, $n_{i,k}$, $\tau_{i,k}$ are selected so that a total charge time ($t_{charge}$) computed as $$t_{charge} = \Sigma_{k=1}^{k=N} \Sigma_{i=1}^{i=P_k}(\tau_{i,k}+\rho_{i,k}) + \Sigma_{k=1}^{k=N} \omega_k$$

is between 2 hours and 2 minutes, with $\omega_k$ being a rest time between two successive bundles.

7. The charging method of claim 1, wherein the SOC determination step comprises implementing a SOC determination method among a group comprising Coulomb counting, Kalman filter, extended Kalman filter, neural networks or thermodynamics.

8. The charging method of claim 1, wherein the SOC determination step is at least partially implemented by an electronic circuit close to or within the electrochemical cell.

9. The charging method of claim 1, wherein the SOC determination step is at least partially implemented by an electronic circuit close to or within a fast-charging system implementing the charging method.

10. The method of claim 1, wherein the electrochemical cell is a secondary battery.

11. The method of claim 10, wherein the electrochemical cell belongs to the group consisting of lithium ion batteries, Sodium ion batteries, Nickel cadmium batteries, lithium polymer batteries, solid state lithium batteries, sodium-sulfur batteries, metal-air batteries, sodium-nickel chloride batteries, nickel metal hydride batteries, lead-acid batteries, or redox-flow batteries.

12. The method of claim 11, wherein the electrochemical cell is a metal-air battery, and wherein a metal in the metal-air battery comprises at least one element selected from among the group consisting of lithium, sodium, magnesium, zinc, aluminum and a combination thereof.

13. A system for fast-charging an electrochemical cell, comprising:
  two or more electrodes for making an electrical connection to terminals of an electrochemical cell having an initial state of charge ($SOC_i$);
  a power supply positioned in electrical communication with the two or more electrodes for providing a controllable time-varying charging voltage to the two or more electrodes; and
  a processor for controlling the charging voltage provided by the power supply, wherein the processor provides a time-varying charging voltage to the electrochemical cell, thereby generating a charging current resulting in charging of the electrochemical cell from the initial state of charge ($SOC_i$) to a state-of-charge target value ($SOC_f$),
  means for real-time determining the state of the charge (SOC) of the electrochemical cell,
wherein the power supply is controlled to apply N bundles of current pulses in such a way that:
  each bundle k ($1 \leq k \leq N$) comprises a variable number $P_k$ of $i_k$ pulses ($1 \leq i_k \leq P_k$) each $i_k$ pulse in a k bundle being defined by a C-rate equal to $n_{i,k} \cdot C$ and a duration $\tau_{j,k}$, with $n_{jk}$ as the ratio of the charging current of said $i_k$ pulse to the nominal capacity of said cell, at each pulse $i_k$, the state of charge (SOC) is increased from said determined state of charge by $\delta_{ik}$ (%)= $n_{i,k} \cdot \tau_{i,k}/M$ with M as a predetermined parameter, two successive current pulse ik and ik+1 in a bundle are separated by a rest time $\rho_{i,k}$ and two successive bundles are separated by a rest time $\omega_k$.

14. The charging system of claim 13, wherein the SOC-determination means comprise an electronic circuit close to or within the electrochemical cell.

15. The charging system of claim 13, wherein the SOC-determination means comprise an electronic circuit close to or within the power supply.

16. A secondary battery charging controller comprising a control circuit for controlling a charging voltage provided by a power supply for charging a secondary battery, wherein the control circuit controls the charging voltage to provide a time-varying charging voltage to an electrochemical cell, thereby generating a charging current resulting in charging of the electrochemical cell from an initial state of charge (SOC$_i$) to a state-of-charge target value (SOC$_f$),
wherein the charging controller is programmed to apply N bundles of current pulses in such a way that:
each bundle k (1≤k≤N) comprises a variable number $P_k$ of $i_k$ pulses (1≤$i_k$≤$P_k$) each $i_k$ pulse in a k bundle being defined by a C-rate equal to $n_{i,k} \cdot C$ and a duration $\tau_{i,k}$, with $n_{ik}$ as the ratio of the charging current of said $i_k$ pulse to the nominal capacity of said cell,
at each pulse $i_k$, the state of charge (SOC) is increased from a determined state of charge by $\delta_{ik}$ (%)= $n_{i,k} \cdot \tau_{i,k}/M$ with M as a predetermined parameter, two successive current pulse ik and ik+1 in a bundle are separated by a rest time $\rho_{i,k}$ and two successive bundles are separated by a rest time $\omega_k$.

* * * * *

UNITED STATES PATENT AND TRADEMARK OFFICE
CERTIFICATE OF CORRECTION

| | |
|---|---|
| PATENT NO. | : 11,431,037 B2 |
| APPLICATION NO. | : 16/770550 |
| DATED | : August 30, 2022 |
| INVENTOR(S) | : Rachid Yazami |

It is certified that error appears in the above-identified patent and that said Letters Patent is hereby corrected as shown below:

In the Specification
    Column 1, Line 10, change "M2018" to --IB2018--
    Column 3, Line 66, change "NIMH" to --NiMH--
    Column 6, Line 42, change "to is" to --$t_0$ is--

In the Claims
Claim 1,   Column 9,   Line 46,   change "$_kM$" to --$_k/M$--
Claim 13,  Column 10,  Line 65,   change "$\tau_{j,k}$," to --$\tau_{i,k}$,--
Claim 13,  Column 10,  Line 66,   change "$n_{ik}$, as" to --$n_{ik}$ as--

Signed and Sealed this
Eleventh Day of April, 2023

Katherine Kelly Vidal
*Director of the United States Patent and Trademark Office*